US012752559B2

(12) United States Patent
Yoshida et al.

(10) Patent No.: US 12,752,559 B2
(45) Date of Patent: Oct. 6, 2026

(54) CASING FOR OPTICAL SCANNING DEVICE, INCLUDING POSITIONING MECHANISM THAT POSITIONS MAIN BODY ON UPPER SIDE WITH RESPECT TO MAIN BODY ON LOWER SIDE, IN HORIZONTAL AND HEIGHT DIRECTIONS, AND OPTICAL SCANNING DEVICE HAVING SUCH CASING

(71) Applicant: KYOCERA Document Solutions Inc., Osaka (JP)

(72) Inventors: Shingo Yoshida, Osaka (JP); Hideji Mizutani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 222 days.

(21) Appl. No.: 18/601,948

(22) Filed: Mar. 11, 2024

(65) Prior Publication Data

US 2024/0310750 A1 Sep. 19, 2024

(30) Foreign Application Priority Data

Mar. 17, 2023 (JP) ................................ 2023-042594

(51) Int. Cl.

| | |
|---|---|
| ***G02B 26/12*** | (2006.01) |
| ***B41J 2/47*** | (2006.01) |
| ***B41J 29/02*** | (2006.01) |
| ***G03G 15/043*** | (2006.01) |

(52) U.S. Cl.

CPC ............... *B41J 29/026* (2013.01); *B41J 2/47* (2013.01); *G02B 26/125* (2013.01); *G03G 15/0435* (2013.01); *G02B 26/122* (2013.01)

(58) Field of Classification Search

CPC .......... G02B 26/10; G02B 26/12; B41J 2/436; B41J 2/47; B41J 29/02; B41J 29/026

See application file for complete search history.

(56) References Cited

U.S. PATENT DOCUMENTS

2019/0302446 A1* 10/2019 Todokoro ................. B41J 2/471

FOREIGN PATENT DOCUMENTS

| | | |
|---|---|---|
| JP | 2006184622 A * | 7/2006 |
| WO | 2018061929 A1 | 4/2018 |

* cited by examiner

*Primary Examiner* — Douglas X Rodriguez
*Assistant Examiner* — Kendrick X Liu
(74) *Attorney, Agent, or Firm* — IP Business Solutions, LLC.

(57) ABSTRACT

A casing for an optical scanning device is configured to accommodate therein a scanning optical system. The casing includes a main body, a lid, a first positioning mechanism, and a second positioning mechanism. The main body includes an opening formed in an upper face. The lid closes the opening of the main body. The first positioning mechanism positions, when a plurality of the main bodies are stacked in a plurality of stages, the main body on an upper stage in a horizontal direction and a height direction, with respect to the main body on a lower stage. The second positioning mechanism positions, when a plurality of the casings, each having the lid attached thereto, are stacked in a plurality of stages, the casing on the upper stage in the horizontal direction and the height direction, with respect to the casing on the lower stage.

6 Claims, 27 Drawing Sheets

CASING FOR OPTICAL SCANNING DEVICE, INCLUDING POSITIONING MECHANISM THAT POSITIONS MAIN BODY ON UPPER SIDE WITH RESPECT TO MAIN BODY ON LOWER SIDE, IN HORIZONTAL AND HEIGHT DIRECTIONS, AND OPTICAL SCANNING DEVICE HAVING SUCH CASING

INCORPORATION BY REFERENCE

This application claims priority to Japanese Patent Application No. 2023-042594 filed on Mar. 17, 2023, the entire contents of which are incorporated by reference herein.

BACKGROUND

The present disclosure relates to a casing used in an optical scanning device that emits light to an image carrier, in an electrophotographic image forming apparatus, thereby forming an electrostatic latent image, and to the optical scanning device having such a casing.

Existing image forming apparatuses, such as an electrophotographic copier or printer, include an optical scanning device. The optical scanning device emits light to an electrically charged image carrier, to thereby form an electrostatic latent image on the image carrier. The casing of the optical scanning device includes a container, one of the faces of which is open, and a lid that covers the opening. A scanning optical system is incorporated inside the container, and the lid includes an emission port of the light outputted from the scanning optical system to the image carrier. The emission port is covered with a transmissive member. The transmissive member allows the light from the scanning optical system to be transmitted therethrough.

There are cases where the casing of the optical scanning device is manufactured in a plant different from the plant where the optical scanning device is assembled. In this case, when the casings are transported to the assembly plant, the casings have to be individually packed, and put in a packaging box with a certain space secured between each other, to prevent damage or breakdown of the base in the casing, on which the optical components are to be mounted. Therefore, the number of casings that can be put in the packaging box is limited, which leads to an increase in transport cost and storage space of the casings.

Accordingly, some measures to transport and store the casings with reduced space, while protecting the casing from damage, have been proposed. For example, a bottomed box-shaped casing for the optical scanning device is known, which includes a bottom wall and sidewalls erected from the periphery of the bottom wall, and an engaging portion provided on the outer face of the sidewall, for fixing the lid. Such casings can be stacked in a plurality of stages, with the lid removed.

SUMMARY

The disclosure proposes further improvement of the foregoing techniques.

In an aspect, the disclosure provides a casing for an optical scanning device, configured to accommodate therein a scanning optical system. The casing includes a main body, a lid, a first positioning mechanism, and a second positioning mechanism. The main body includes an opening formed in an upper face. The lid closes the opening of the main body. The first positioning mechanism positions, when a plurality of the main bodies are stacked in a plurality of stages, the main body on an upper stage in a horizontal direction and a height direction, with respect to the main body on a lower stage. The second positioning mechanism positions, when a plurality of the casings, each having the lid attached thereto, are stacked in a plurality of stages, the casing on the upper stage in the horizontal direction and the height direction, with respect to the casing on the lower stage.

In another aspect, the disclosure provides an optical scanning device including a scanning optical system and the foregoing casing. The scanning optical system scans, with a light beam, a surface of an image carrier charged to a predetermined surface potential, thereby exposing the surface of the image carrier to the light beam, and forms an electrostatic latent image by attenuating the charge. The casing retains optical elements constituting the scanning optical system.

DETAILED DESCRIPTION

Figure 1:
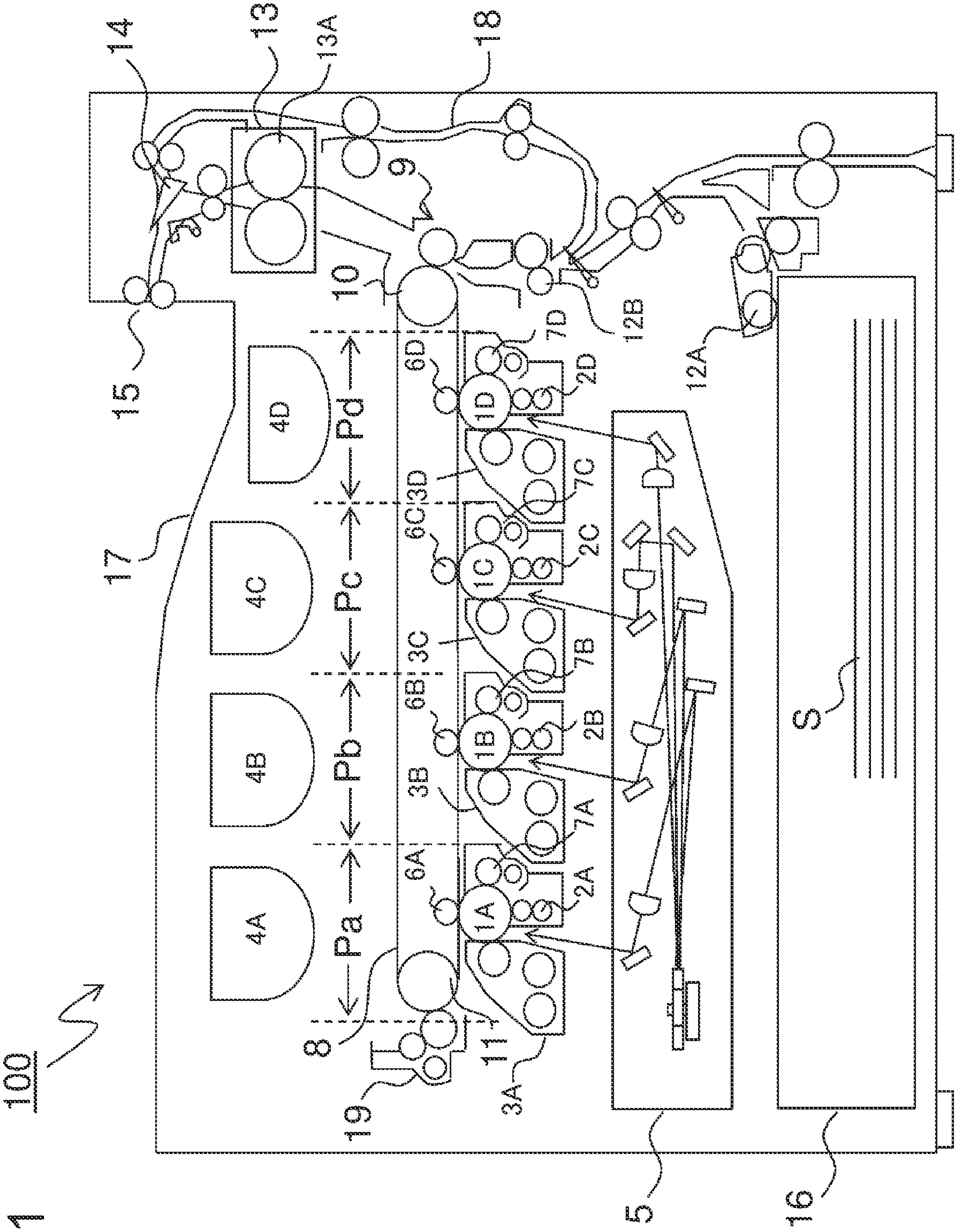
FIG. 1 is a schematic cross-sectional view showing an overall configuration of an image forming apparatus 100 including an optical scanning device 5 according to an embodiment of the disclosure.
Figure 2:
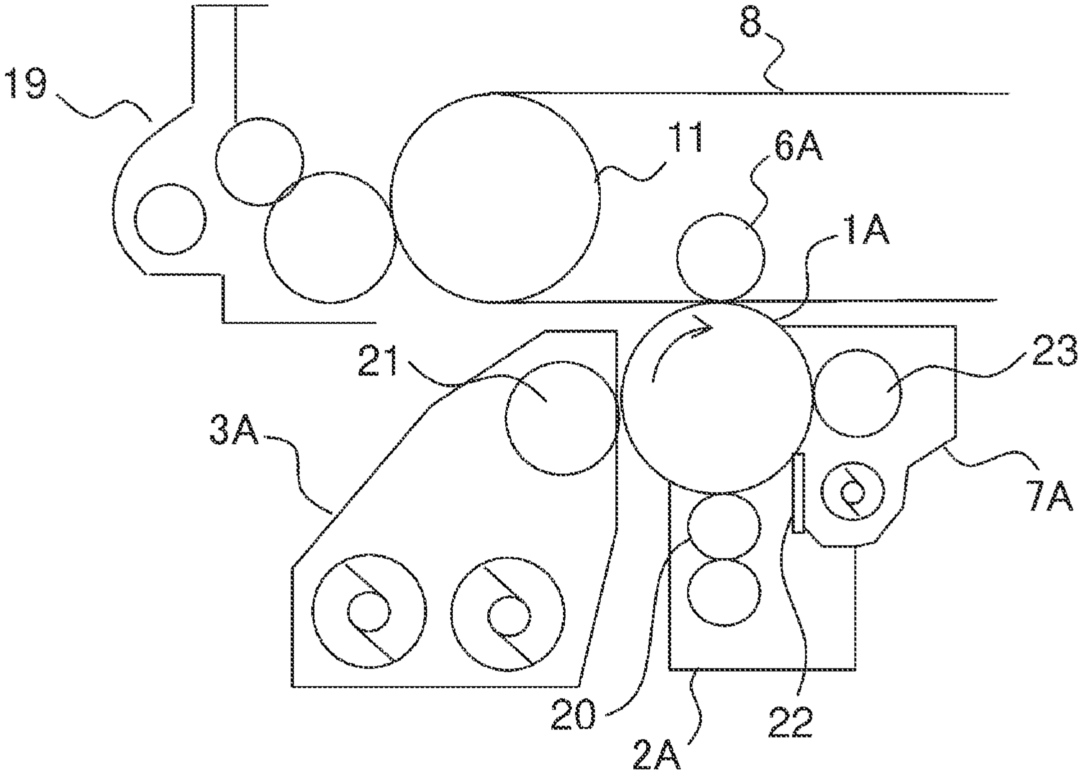
FIG. 2 is an enlarged schematic cross-sectional view showing a portion around an image forming device Pa in FIG. 1.

Hereafter, an embodiment of the disclosure will be described, with reference to the drawings. FIG. 1 is a schematic cross-sectional view showing an overall configuration of an image forming apparatus 100 including an optical scanning device 5 according to an embodiment of the disclosure. FIG. 2 is an enlarged schematic cross-sectional view showing a portion around an image forming device Pa in FIG. 1.

The image forming apparatus 100 shown in FIG. 1 is what is known as a tandem-type color printer, configured as follows. Inside the main body of the image forming apparatus 100, four image forming devices Pa, Pb, Pc, and Pd are sequentially aligned, from the upstream side in the transport direction (left side in FIG. 1). The image forming devices Pa to Pd respectively correspond to images of four colors, namely magenta, cyan, yellow, and black, to sequentially form the images of magenta, cyan, yellow, and black, through a process including charging, exposure, developing, and transfer.

The image forming devices Pa to Pd respectively include photoconductor drums 1A, 1B, 1C, and 1D that each carry a visible image of the corresponding color (toner image). In addition, an intermediate transfer belt 8, set to revolve counterclockwise in FIG. 1, is provided closely along the image forming devices Pa to Pd. The toner images formed on the photoconductor drums 1A to 1D are sequentially transferred to the intermediate transfer belt 8, moving in contact with the photoconductor drums 1A to 1D, and then transferred at a time to a sheet S, serving as a recording medium, via a secondary transfer unit 9. Further, after the toner image is fixed onto the sheet S by the fixing device 13, the sheet S is delivered from the main body of the image forming apparatus 100. The photoconductor drums 1A to 1D are made to rotate clockwise in FIG. 1, when the image forming operation is performed with respect to the photoconductor drums 1A to 1D.

The sheet S to which the toner image is to be transferred is stored in a sheet cassette 16 located in a lower portion of the main body of the image forming apparatus 100, and transported to the secondary transfer unit 9, via a feeding roller 12A and a resist roller pair 12B. Typically, a seamless belt is employed as the intermediate transfer belt 8.

Hereunder, the image forming devices Pa to Pd will be described. The following description refers to the image forming device Pa in detail, but the description about the remaining image forming devices Pb to Pd will not be given, since these image forming devices are basically configured in the same way. Referring to FIG. 2, a charging device 2A, a developing device 3A, and a cleaning device 7A are provided around the photoconductor drum 1A, along the rotation direction of the drum (clockwise in FIG. 2), and a primary transfer roller 6A is provided across the intermediate transfer belt 8. Further, a belt cleaning unit 19, opposed to a tension roller 11 across the intermediate transfer belt 8, is provided on the upstream side in the rotation direction of the intermediate transfer belt 8, with respect to the photoconductor drum 1A.

The image forming process performed by the image forming apparatus 100 will now be described hereunder. When an instruction to start the image forming operation is inputted by the user, first a main motor starts to rotate the photoconductor drums 1A to 1D, and respective charging rollers 20 of the charging devices 2A to 2D uniformly charge the surface of the photoconductor drums 1A to 1D. Then the surface of each of the photoconductor drums 1A to 1D is irradiated with a light beam (laser beam) emitted from the optical scanning device 5, so that an electrostatic latent image based on an image signal is formed on each of the photoconductor drum 1A to 1D.

The developing devices 3A to 3D are loaded with a predetermined amount of toner of magenta, cyan, yellow, and black, respectively. When the ratio of the toner in a two-component developing agent, loaded in each of the developing devices 3A to 3D, falls below a prespecified level because of forming the toner image as will be subsequently described, the developing devices 3A to 3D are replenished with the toner from toner containers 4A to 4D, respectively. The toner in the developing agent is supplied to the photoconductor drums 1A to 1D via the developing roller 21 of the developing devices 3A to 3D, and electrostatically stuck to the photoconductor drums. Thus, the toner image is formed, on the basis of the electrostatic latent image formed by the exposure by the optical scanning device 5.

Then the primary transfer rollers 6A to 6D each apply an electric field of a predetermined transfer voltage, between the primary transfer rollers 6A to 6D and the photoconductor drums 1A to 1D respectively, and the toner images of magenta, cyan, yellow, and black on the photoconductor drums 1A to 1D are transferred to the intermediate transfer belt 8, as primary transfer. The images of the respective colors are formed with a predetermined positional relation, to form a predetermined full-color image. Thereafter, the toner remaining on the surface of each of the photoconductor drums 1A to 1D is removed by a cleaning blade 22 and a scraping roller 23 of the cleaning device 7A to 7D, in preparation for the formation of the next electrostatic latent image, to be successively performed.

When a belt drive motor rotates a drive roller 10, thereby causing the intermediate transfer belt 8 to rotate counterclockwise, the sheet S is transported at a predetermined timing from the resist roller pair 12B to the secondary transfer unit 9 provided in contact with the intermediate transfer belt 8, so that the full-color image is transferred to the sheet S. The sheet S having the toner image transferred thereto is transported to the fixing device 13. The toner remaining on the surface of the intermediate transfer belt 8 is removed by the belt cleaning unit 19.

The sheet S delivered to the fixing device 13 is heated and pressed by a fixing roller pair 13A, so that the toner image is fixed onto the surface of the sheet S, and thus a predetermined full-color image is formed. The sheet S having the full-color image formed thereon is directed to a predetermined transport route at a branch point 14, branched to a plurality of directions, and delivered to an output tray 17 via a delivery roller pair 15 as it is, or after being delivered to a duplex transport route 18 to undergo a duplex printing operation.

Figure 3:
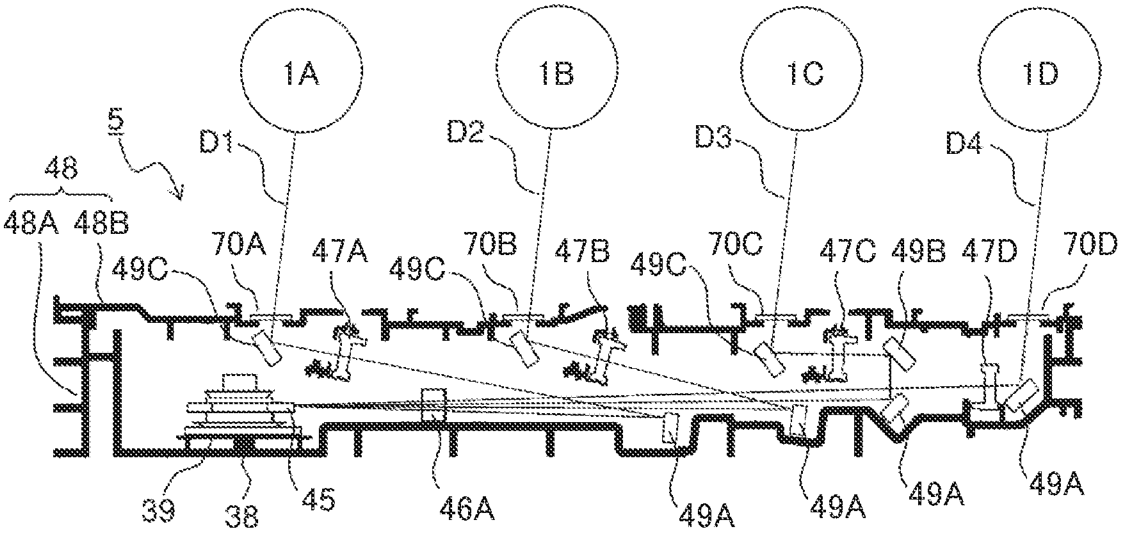
FIG. 3 is a side cross-sectional view showing an internal structure of the optical scanning device 5.

Hereunder, the optical scanning device 5 will be described. FIG. 3 is a side cross-sectional view showing an internal structure of the optical scanning device 5. As shown in FIG. 3, the optical scanning device 5 includes a casing 48. The casing 48 includes a main body 48A and a lid 48B. A polygon mirror 45 is provided on the bottom face of the main body 48A. In this embodiment, the polygon mirror 45 is a rotary polygon mirror of a regular polygonal shape, having a plurality of deflection surfaces (reflection surfaces) on the side face, and is made to rotate by a polygon motor 38 at a predetermined speed. The polygon motor 38 is fixed to a motor base plate 39, which is fixed to the bottom face of the main body 48A.

Inside the casing 48, a laser light source, a collimator lens, an aperture, a cylindrical lens, a first scanning lens 46A, second scanning lenses 47A to 47D, and flat mirrors A to 49C are accommodated. The first scanning lens 46A and the second scanning lenses 47A to 47D each have fθ characteristics, and form an image based on laser beams D1 to D4, deflectively reflected by the polygon mirror 45, on the photoconductor drum 1A to 1D. Further, the flat mirrors 49A to 49C are located on the respective optical paths of the laser beams D1 to D4 from the polygon mirror 45 as far as the photoconductor drums 1A to 1D (see FIG. 1).

The scanning operation performed by the optical scanning device 5 configured as above, with the laser beams D1 and D2, will be described hereunder. First, the laser beams D1 and D2 emitted from the laser light source are each turned to a generally parallel light flux by the collimator lens, and the aperture defines a predetermined optical path width. The laser beams D1 and D2 turned to the generally parallel light flux are then made incident on the cylindrical lens. The laser beams D1 and D2 incident on the cylindrical lens are emitted keeping the state of the parallel light flux in the main scanning cross-section, and in a converged state in the sub scanning direction, and form an image on the deflection surface of the polygon mirror 45, in the form of a line image. At this point, the laser beams D1 and D2 are made incident on the deflection surface at different angles in the sub scanning direction, to facilitate the separation of the optical paths of the two laser beams D1 and D2 deflected by the polygon mirror 45.

The laser beams D1 and D2 incident on the polygon mirror 45 are deflected at constant angular velocity by the polygon mirror 45, and then deflected at constant velocity by the first scanning lens 46A. The laser beams D1 and D2 that have passed the first scanning lens 46A are reflected by the flat mirrors 49A located on the respective optical paths, such that the laser beam D1 is incident on the second scanning lens 47A and the laser beam D2 is incident on the second scanning lens 47B, to be deflected at constant velocity by the respective second scanning lenses 47A and 47B. Then the laser beams D1 and D2 deflected at constant velocity are reflected by the last flat mirror 49C located on the respective optical paths, and supplied to the photoconductor drums 1A and 1B respectively, through windows 70A and 70B formed in the lid 48B covering the opening of the main body 48A.

The laser beams D3 and D4 emitted from the laser light source are, similarly to the above, deflected at constant angle by the polygon mirror 45, and deflected at constant velocity by the first scanning lens 46A, after passing through the collimator lens, the aperture, and the cylindrical lens. The laser beam D3 that has passed through the first scanning lens 46A is incident on the second scanning lens 47C, after being reflected twice by the flat mirrors 49A and 49B located on the optical path, and the laser beam D4 that has passed through the first scanning lens 46A is incident on the second scanning lens 47D, to be each deflected at constant velocity. Further, the laser beam D3 is reflected by the last flat mirror 49C, and the laser beam D4 is reflected by the flat mirror 49A, to be supplied to the photoconductor drums 1C and 1D respectively, through windows 70A and 70B formed in the lid 48B.

The polygon mirror 45, the first scanning lens 46A, the second scanning lenses 47A to 47D, and the flat mirrors 49A to 49C constitute a scanning optical system that leads the laser beams D1 to D4 to the photoconductor drums 1A to 1D, respectively.

Figure 4:
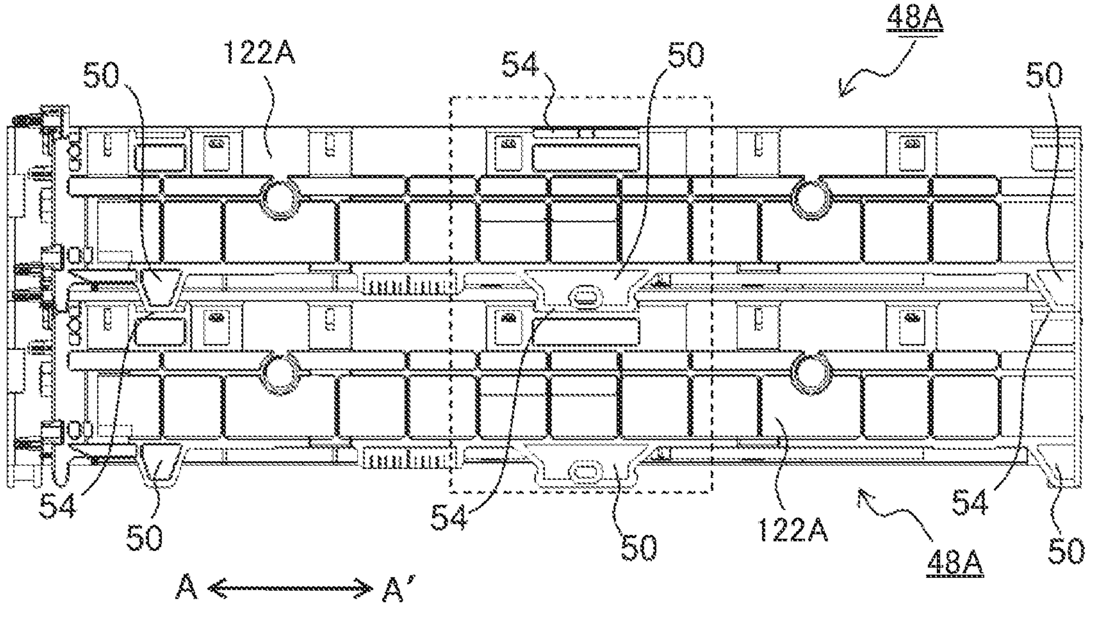
FIG. 4 is a side view showing main bodies 48A of a casing 48 stacked in two stages, seen from the front side of the optical scanning device 5.
Figure 5:
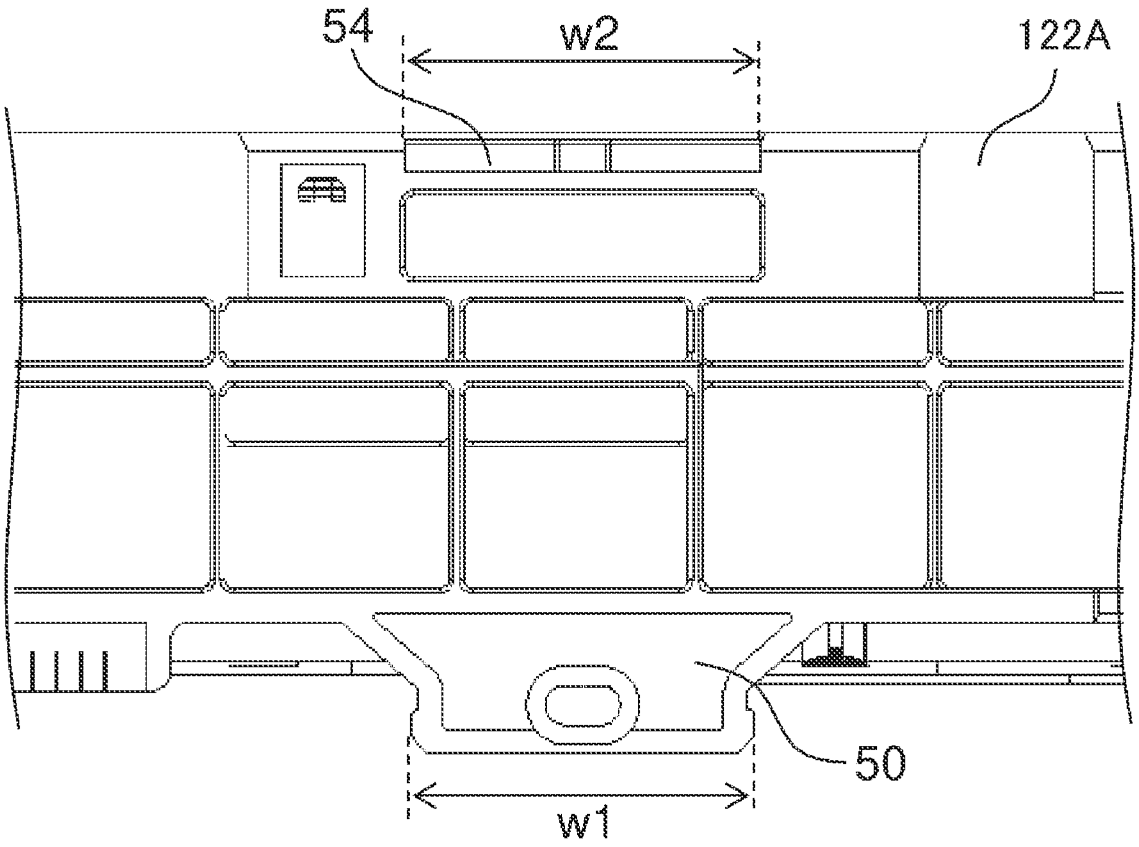
FIG. 5 is an enlarged side view showing a portion around a first engaging protrusion 50 and a first engaging recess 54 in the main body 48A.
Figure 6:
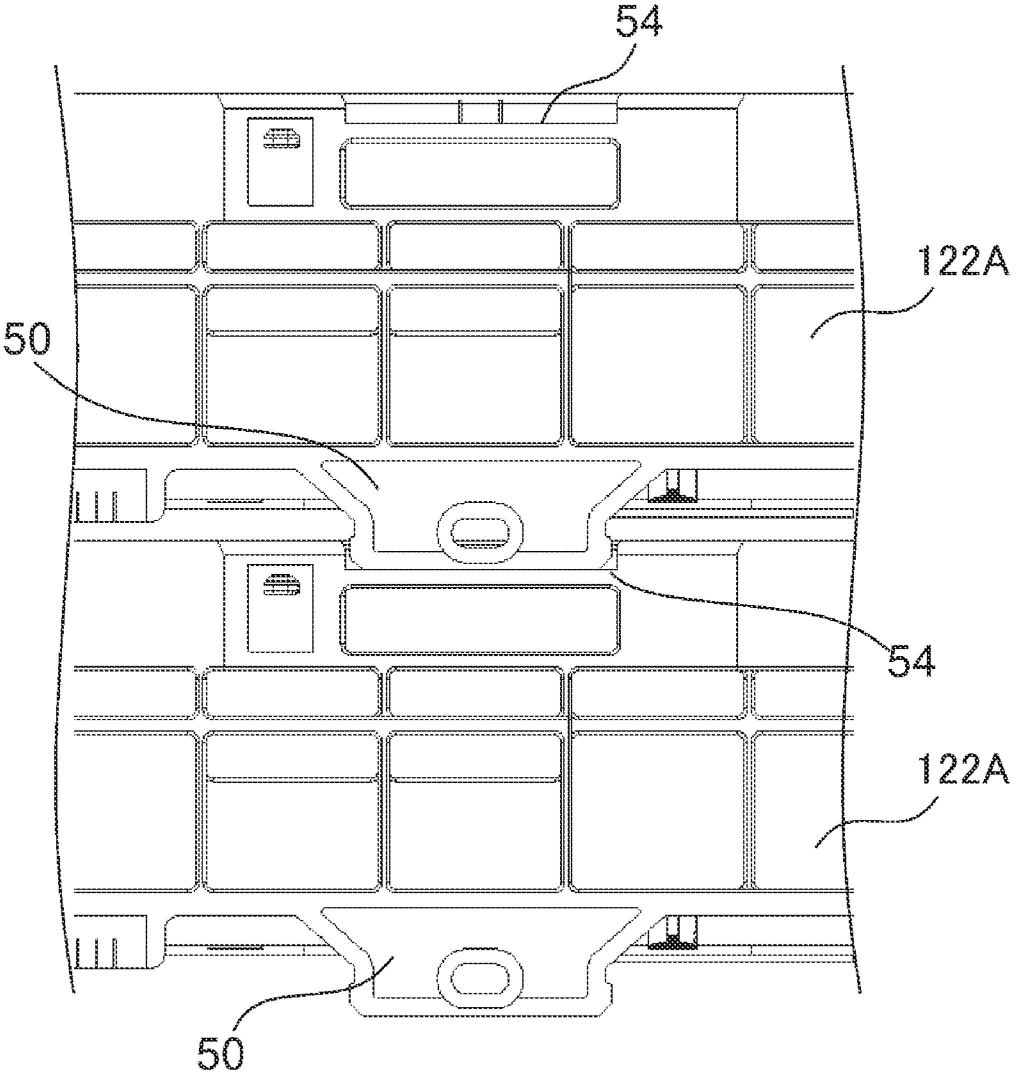
FIG. 6 is an enlarged side view from FIG. 4, showing a central portion in the left-right direction.

FIG. 4 is a side view showing the main bodies 48A of the casing 48 stacked in two stages, seen from the front side of the optical scanning device 5. FIG. 5 is an enlarged side view showing a portion around a first engaging protrusion 50 and a first engaging recess 54 in the main body 48A. FIG. 6 is an enlarged side view from FIG. 4, showing a central portion in the left-right direction (enclosed by broken lines in FIG. 4). As shown in FIG. 4 to FIG. 6, the main body 48A includes the first engaging protrusion 50 and the first engaging recess 54, formed on a side face 122A oriented to the front side of the optical scanning device 5.

The first engaging protrusion 50 is formed so as to protrude downward, from the lower end portion of the side face 122A. The first engaging protrusion 50 is provided at three positions, namely a generally central position in the left-right direction of the side face 122A (indicated by an arrow A-A'), and on the left and right thereof.

The first engaging recess 54 is formed on the upper end portion of the side face 122A. The first engaging recess 54 is formed at three positions along the left-right direction of the side face 122A, so as to overlap with the positions of the first engaging protrusion 50. A width w1 of the first engaging protrusion 50 is slightly narrower than a width w2 of the first engaging recess 54.

Figure 7:
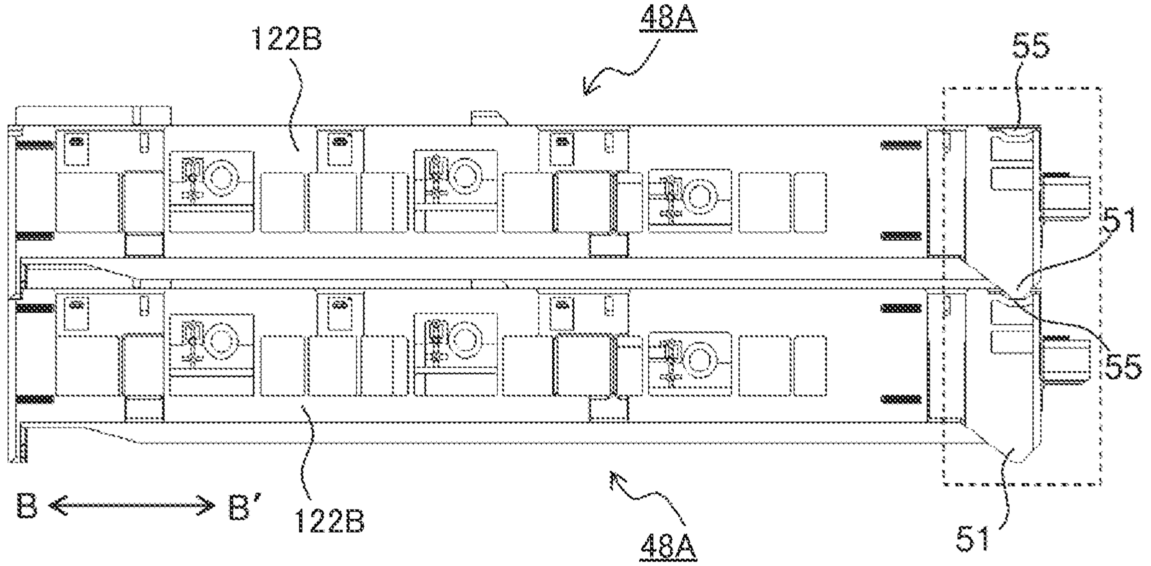
FIG. 7 is a side view showing the main bodies 48A stacked in two stages, seen from the right side of the optical scanning device 5.
Figure 8:
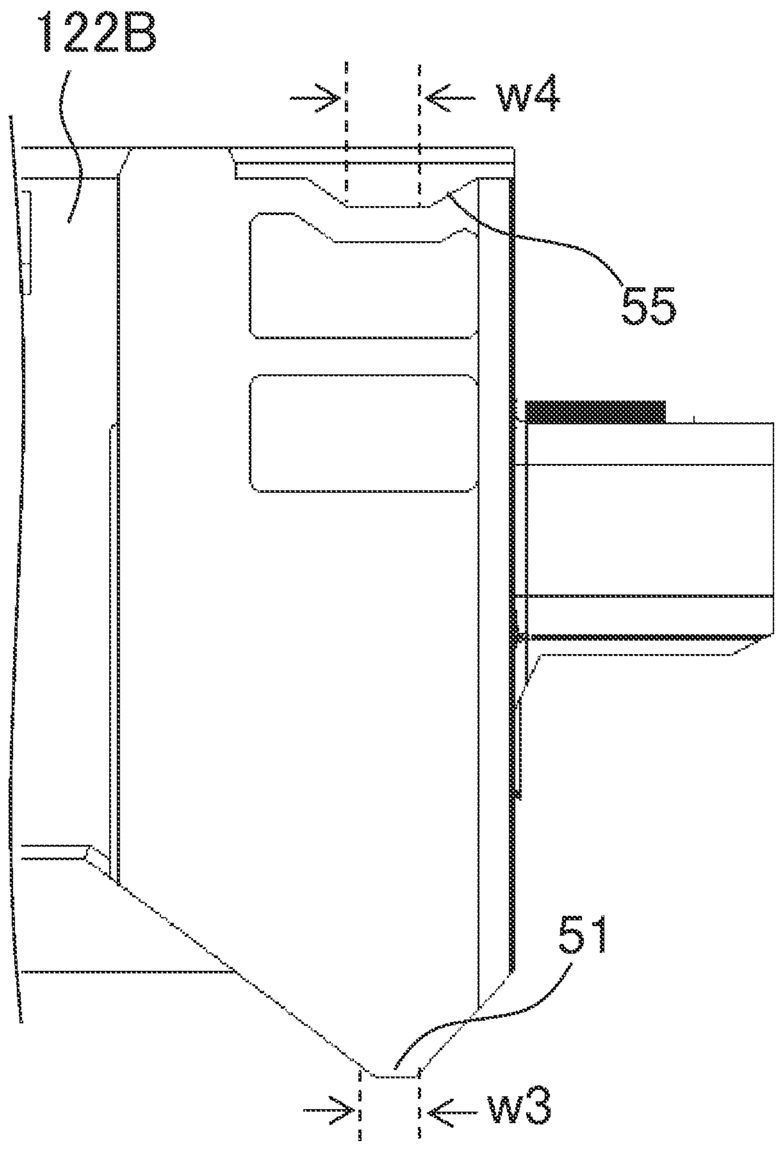
FIG. 8 is an enlarged side view showing a portion around a second engaging protrusion 51 and a second engaging recess 55 in the main body 48A.
Figure 9:
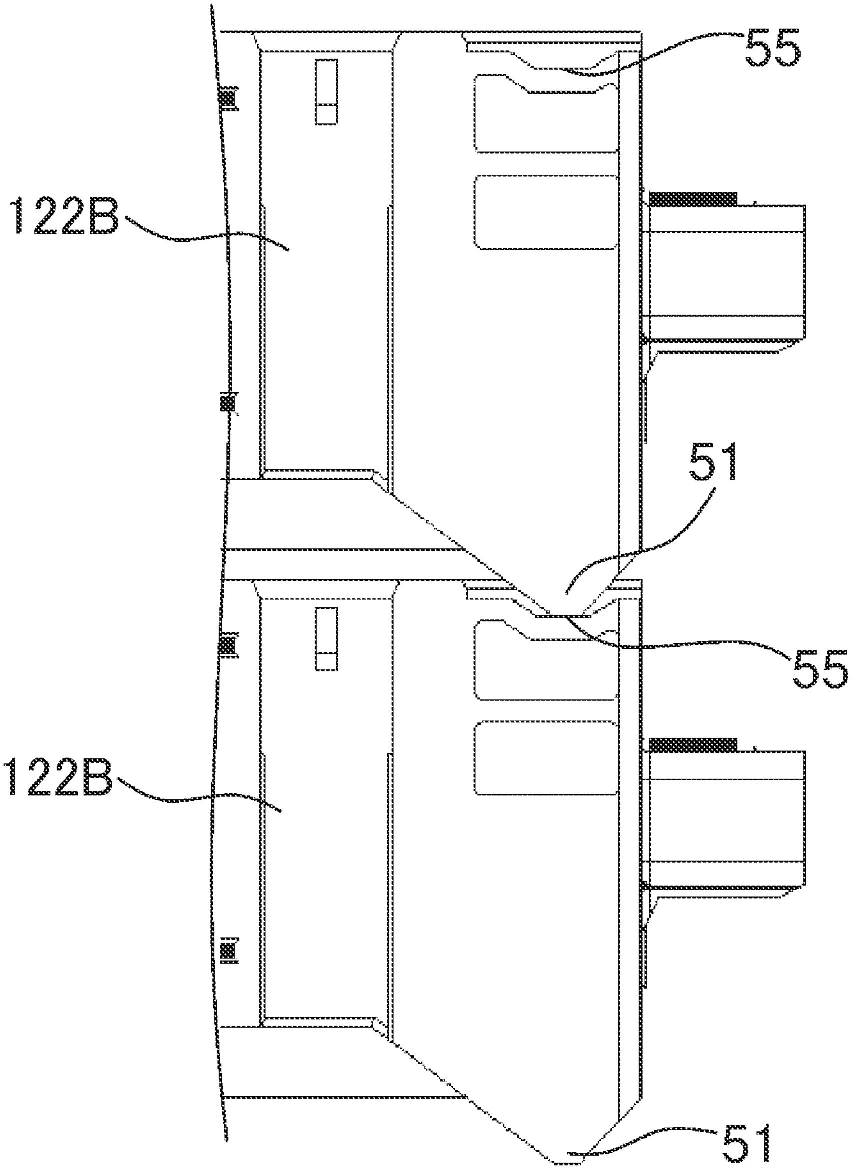
FIG. 9 is an enlarged side view from FIG. 7, showing a rear end portion in the front-rear direction.

FIG. 7 is a side view showing the main bodies 48A stacked in two stages, seen from the right side of the optical scanning device 5 (from the right side in FIG. 4). FIG. 8 is an enlarged side view showing a portion around a second engaging protrusion 51 and a second engaging recess 55 in the main body 48A. FIG. 9 is an enlarged side view from FIG. 7, showing a rear end portion in the front-rear direction (enclosed by broken lines in FIG. 7). As shown in FIG. 7 to FIG. 9, the main body 48A includes the second engaging protrusion 51 and the second engaging recess 55, formed on a side face 122B oriented to the right side of the optical scanning device 5.

The second engaging protrusion 51 is formed so as to protrude downward, from the lower end portion of the side face 122B. The second engaging protrusion 51 is formed at the rear end portion of the side face 122B in the front-rear direction (indicated by an arrow B-B'). The protrusion amount of the second engaging protrusion 51 from the lower end portion of the main body 48A is equal to that of the first engaging protrusion 50.

The second engaging recess 55 is formed on the upper end portion of the side face 122B. The second engaging recess 55 is formed at the position overlapping with the second engaging protrusion 51, in the front-rear direction. A width w3 of the second engaging protrusion 51 is slightly narrower than a width w4 of the second engaging recess 55. The depth of the second engaging recess 55 from the upper end portion of the main body 48A is equal to that of the first engaging recess 54.

Figure 10:
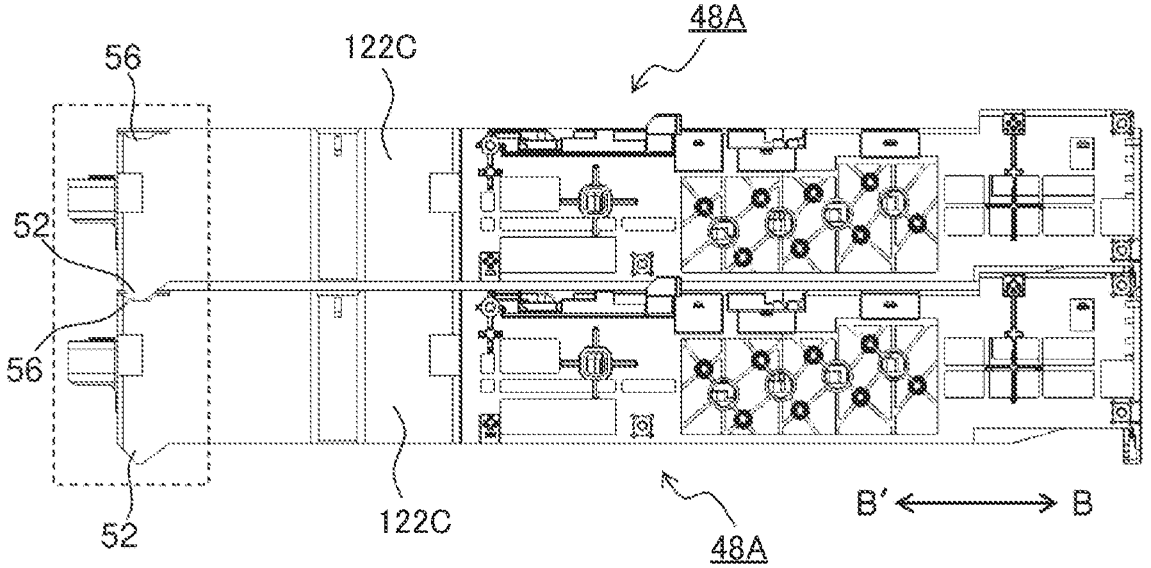
FIG. 10 is a side view showing the main bodies 48A stacked in two stages, seen from the left side of the optical scanning device 5.
Figure 11:
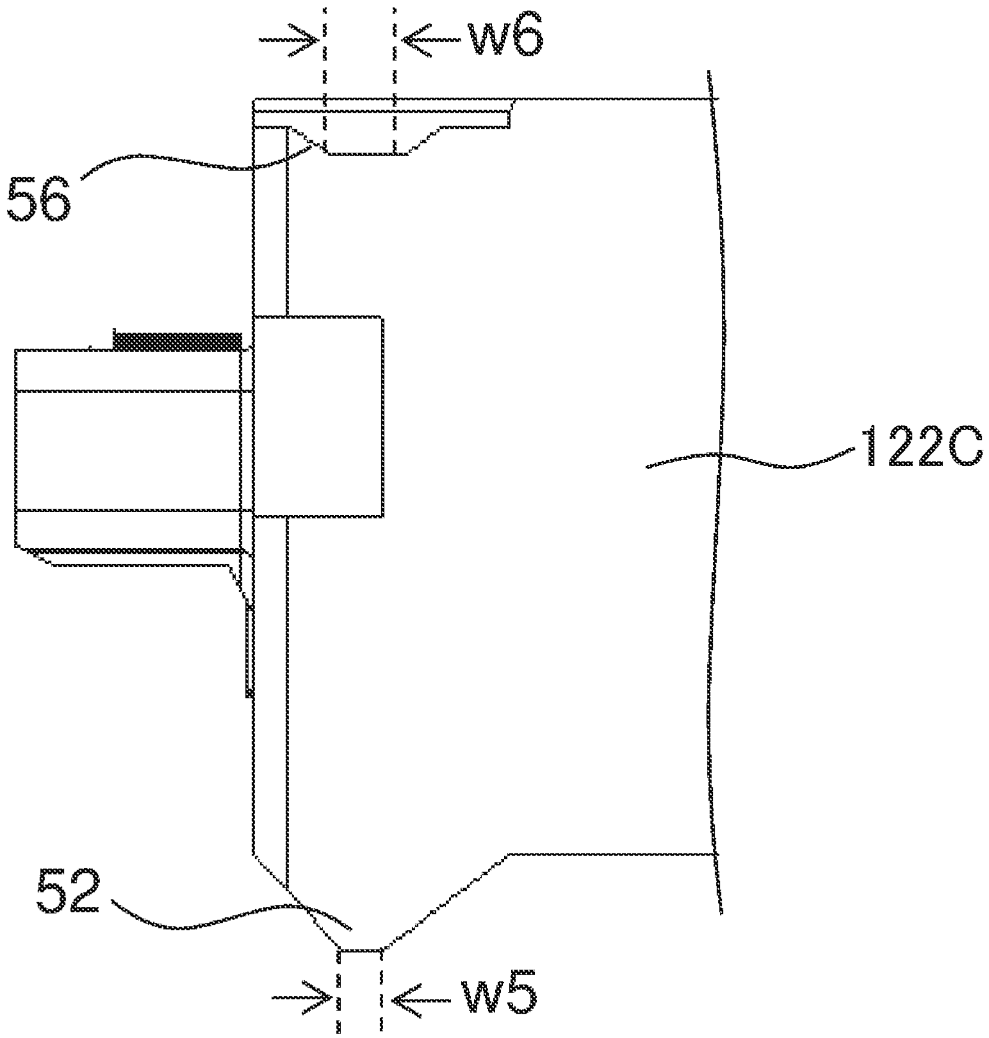
FIG. 11 is an enlarged side view showing a portion around a third engaging protrusion 52 and a third engaging recess 56 in the main body 48A.
Figure 12:
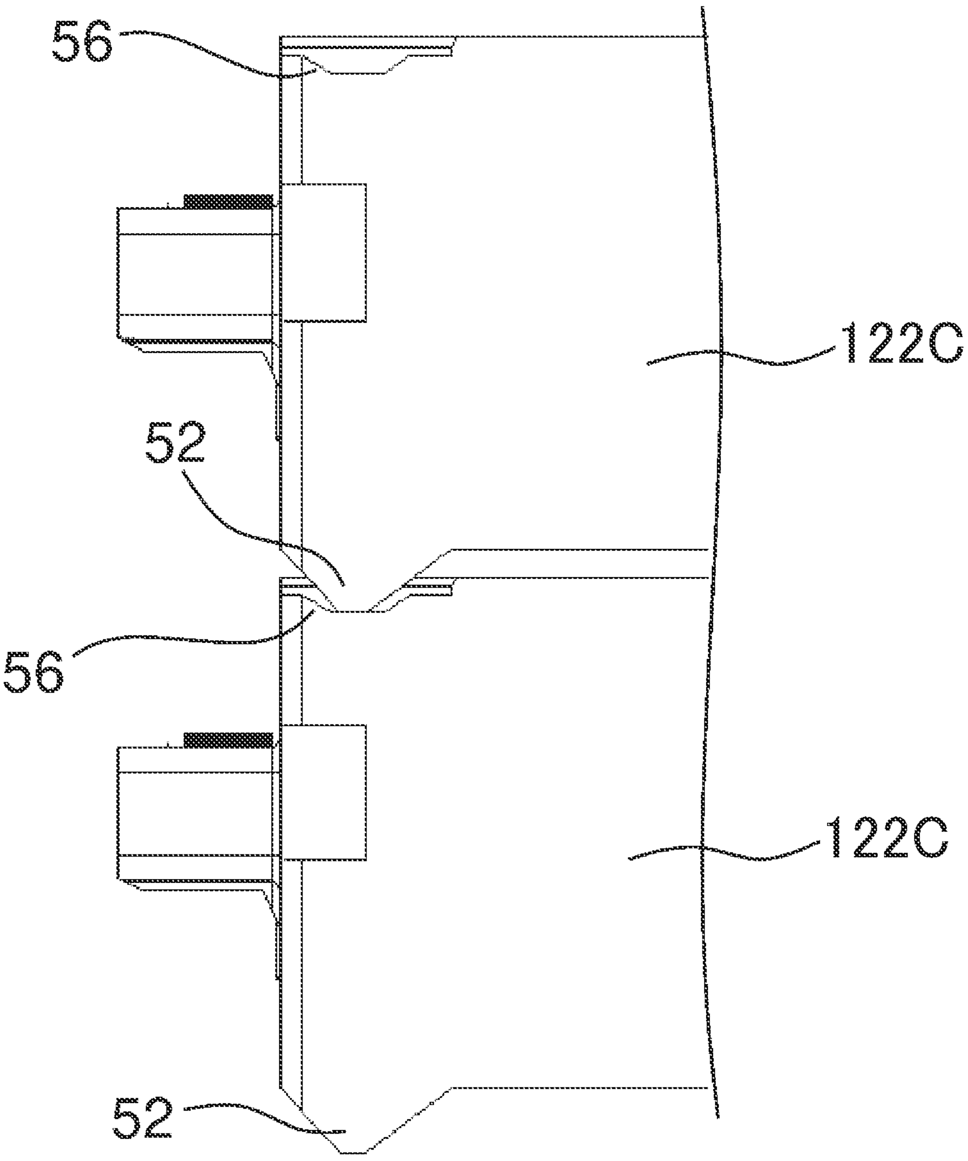
FIG. 12 is an enlarged side view from FIG. 10, showing a left end portion in the left-right direction.

FIG. 10 is a side view showing the main bodies 48A stacked in two stages, seen from the left side of the optical scanning device 5 (from the left side in FIG. 4). FIG. 11 is an enlarged side view showing a portion around a third engaging protrusion 52 and a third engaging recess 56 in the main body 48A. FIG. 12 is an enlarged side view from FIG. 10, showing a left end portion in the left-right direction (enclosed by broken lines in FIG. 10). As shown in FIG. 10 to FIG. 12, the main body 48A includes the third engaging protrusion 52 and the third engaging recess 56, formed on a side face 122C oriented to the left side of the optical scanning device 5.

The third engaging protrusion 52 is formed so as to protrude downward, from the lower end portion of the side face 122C. The third engaging protrusion 52 is formed at the rear end portion of the side face 122C in the front-rear direction (indicated by the arrow B-B'). The protrusion amount of the third engaging protrusion 52 from the lower end portion of the main body 48A is equal to that of the first engaging protrusion 50 and the second engaging protrusion 51.

The third engaging recess 56 is formed on the upper end portion of the side face 122C. The third engaging recess 56 is formed at the position overlapping with the third engaging protrusion 52, in the left-right direction. A width w5 of the third engaging protrusion 52 is slightly narrower than a width w6 of the third engaging recess 56. The depth of the third engaging recess 56 from the upper end portion of the main body 48A is equal to that of the first engaging recess 54 and the second engaging recess 55.

Figure 13:
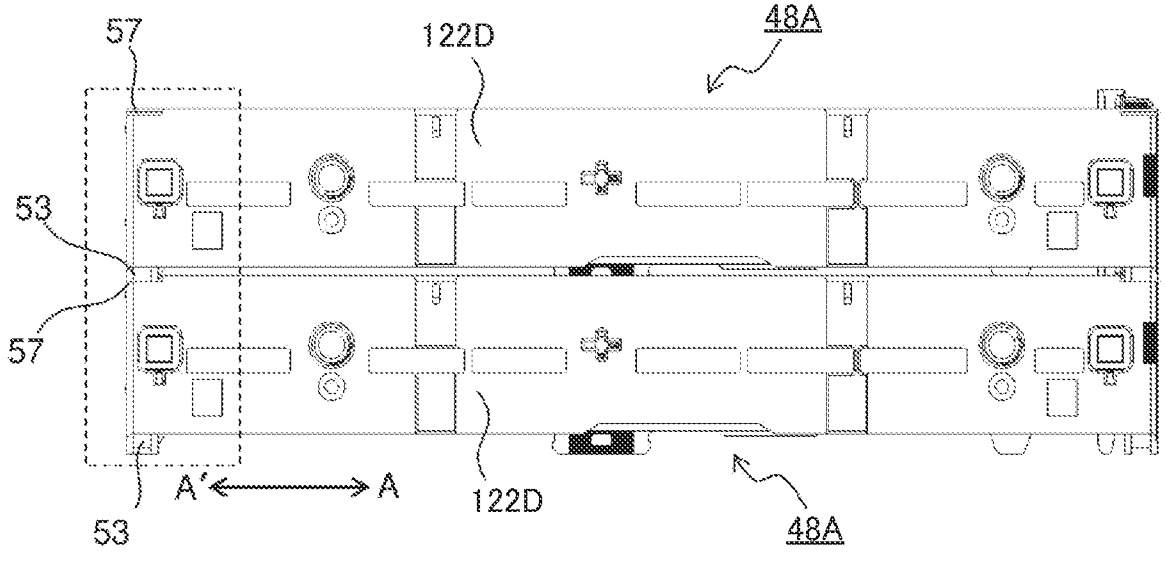
FIG. 13 is a side view showing the main bodies 48A stacked in two stages, seen from the rear side of the optical scanning device 5.
Figure 14:
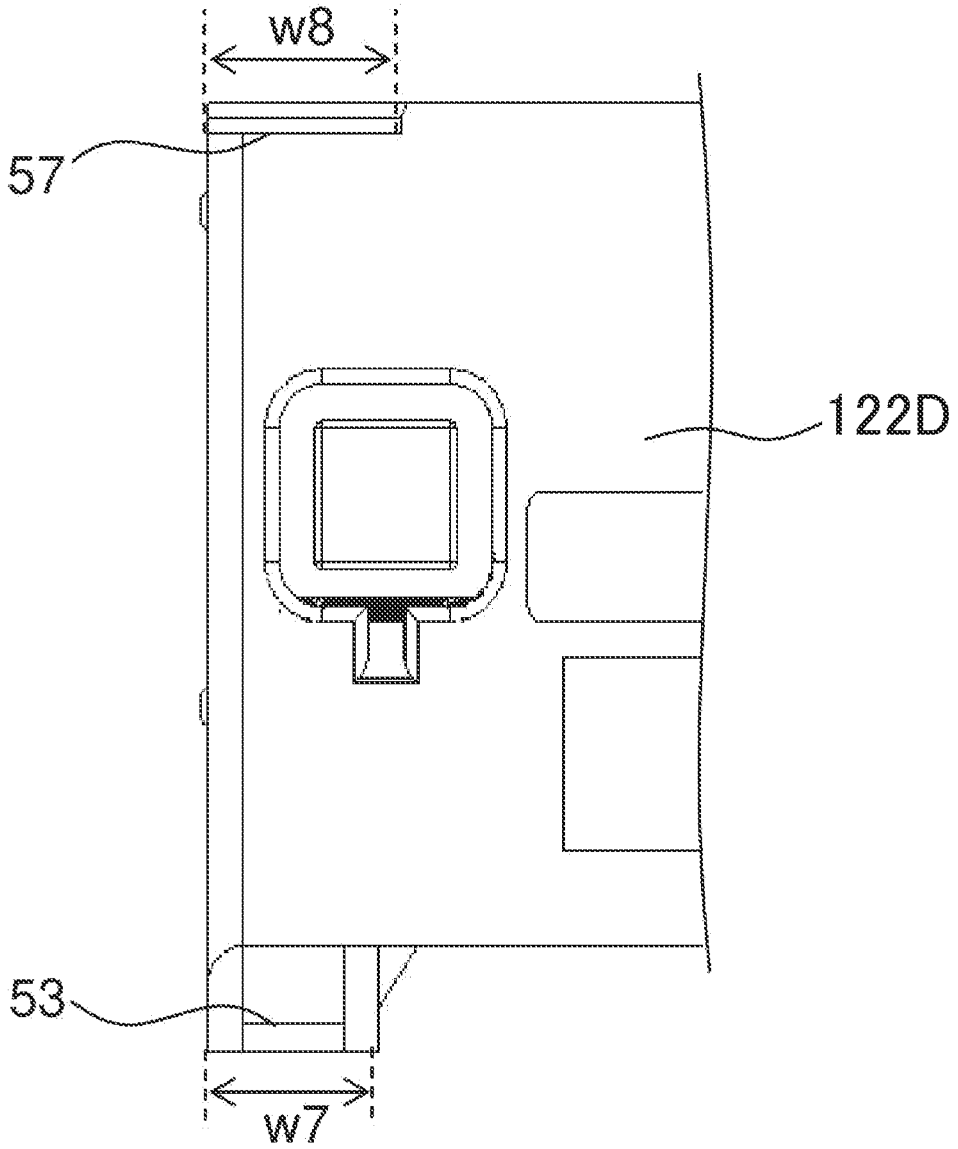
FIG. 14 is an enlarged side view showing a portion around a fourth engaging protrusion 53 and a fourth engaging recess 57 in the main body 48A.
Figure 15:
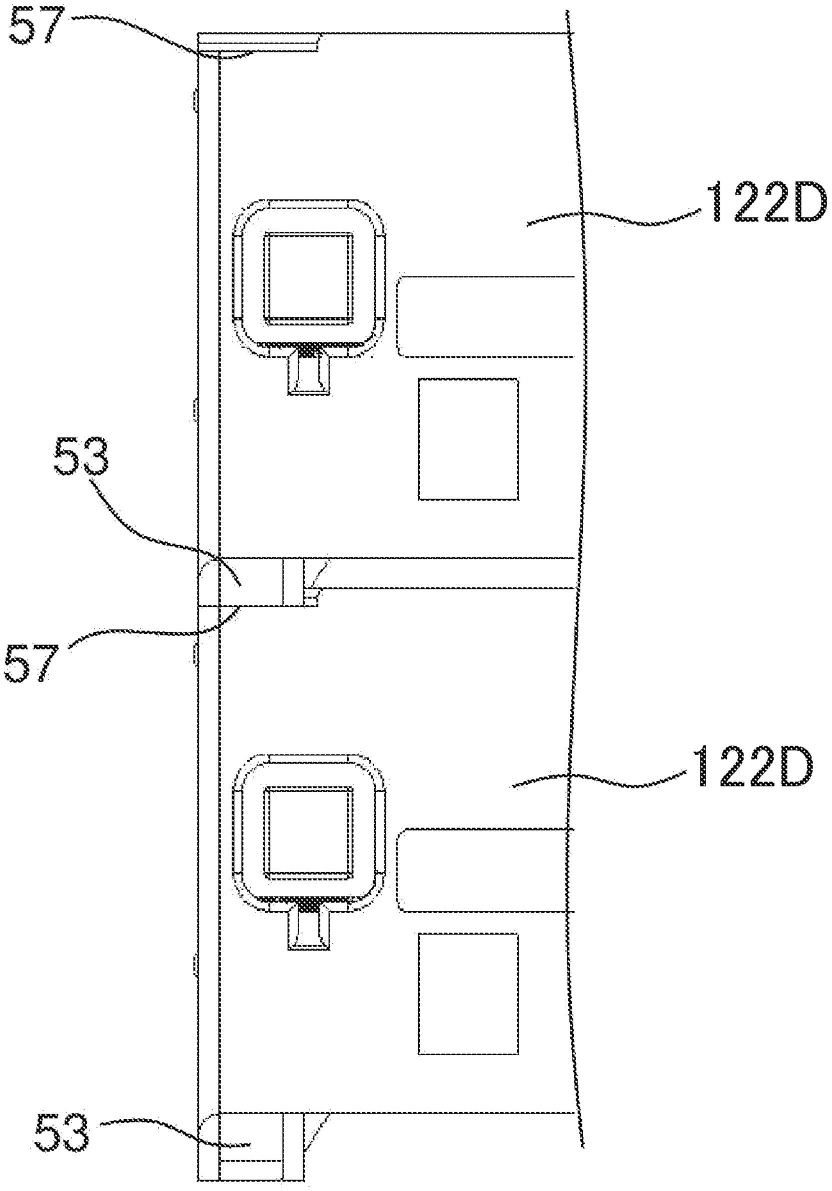
FIG. 15 is an enlarged side view from FIG. 13, showing a left end portion in the left-right direction.

FIG. 13 is a side view showing the main bodies 48A stacked in two stages, seen from the rear side of the optical scanning device 5. FIG. 14 is an enlarged side view showing a portion around a fourth engaging protrusion 53 and a fourth engaging recess 57 in the main body 48A. FIG. 15 is an enlarged side view from FIG. 13, showing a left end portion in the left-right direction (enclosed by broken lines in FIG. 13). As shown in FIG. 13 to FIG. 15, the main body 48A includes the fourth engaging protrusion 53 and the fourth engaging recess 57, formed on a side face 122D oriented to the rear side of the optical scanning device 5.

The fourth engaging protrusion 53 is formed so as to protrude downward, from the lower end portion of the side face 122D. The fourth engaging protrusion 53 is formed at the left end portion of the side face 122D in the left-right direction (indicated by an arrow A'-A). The protrusion amount of the fourth engaging protrusion 53 from the lower end portion of the main body 48A is equal to that of the first engaging protrusion 50, the second engaging protrusion 51, and the third engaging protrusion 52.

The fourth engaging recess 57 is formed on the upper end portion of the side face 122D. The fourth engaging recess 57 is formed at the position overlapping with the fourth engaging protrusion 53, in the left-right direction. A width w7 of the fourth engaging protrusion 53 is slightly narrower than a width w8 of the fourth engaging recess 57. The depth of the fourth engaging recess 57 from the upper end portion of the main body 48A is equal to that of the first engaging recess 54, the second engaging recess 55, and the third engaging recess 56.

When the main bodies 48A are stacked in two stages, the first engaging protrusion 50 of the main body 48A on the upper stage is engaged with the first engaging recess 54 of the main body 48A on the lower stage (see FIG. 4 and FIG. 6). Likewise, the second engaging protrusion 51 of the main body 48A on the upper stage is engaged with the second engaging recess 55 of the main body 48A on the lower stage (see FIG. 7 and FIG. 9). In addition, the third engaging protrusion 52 of the main body 48A on the upper stage is engaged with the third engaging recess 56 of the main body 48A on the lower stage (see FIG. 10 and FIG. 12), and the fourth engaging protrusion 53 of the main body 48A on the upper stage is engaged with the fourth engaging recess 57 of the main body 48A on the lower stage (see FIG. 13 and FIG. 15).

Accordingly, the main body 48A on the upper stage is positioned with respect to the main body 48A on the lower stage, in the horizontal direction namely the left-right direction and the front-rear direction, and in the up-down direction. The first to fourth engaging protrusions 50 to 53, and the first to fourth engaging recesses 54 to 57, constitute a first positioning mechanism for positioning the main body 48A on the upper stage with respect to the main body 48A on the lower stage, in the horizontal direction and the height direction, when the main bodies 48A are stacked in a plurality of stages.

The first to third engaging protrusions 50 to 52, and the first engaging recess 54 to third engaging recess 56 each have an inverted trapezoidal shape in a side view. Accordingly, in the case where the main body 48A on the upper stage is slightly shifted in the left-right direction or front-rear direction, when being stacked, the first to third engaging protrusions 50 to 52 can be smoothly introduced into the first to third engaging recesses 54 to 56, respectively.

In addition, since the protrusion amount of the first to fourth engaging protrusions 50 to 53 from the lower end portion of the main body 48A is equal to the depth of the first to fourth engaging recesses 54 to 57 from the upper end portion of the main body 48A, the main body 48A on the upper stage can be stacked on the main body 48A on the lower stage, in the horizontal posture.

Further, the first to fourth engaging protrusions 50 to 53 are formed at three or more positions on the different side faces of the main body 48A, in other words at three or more positions that do not fall on the same straight line. Therefore, the main body 48A of the lowermost stage can be stably placed on the stacking surface.

Figure 16:
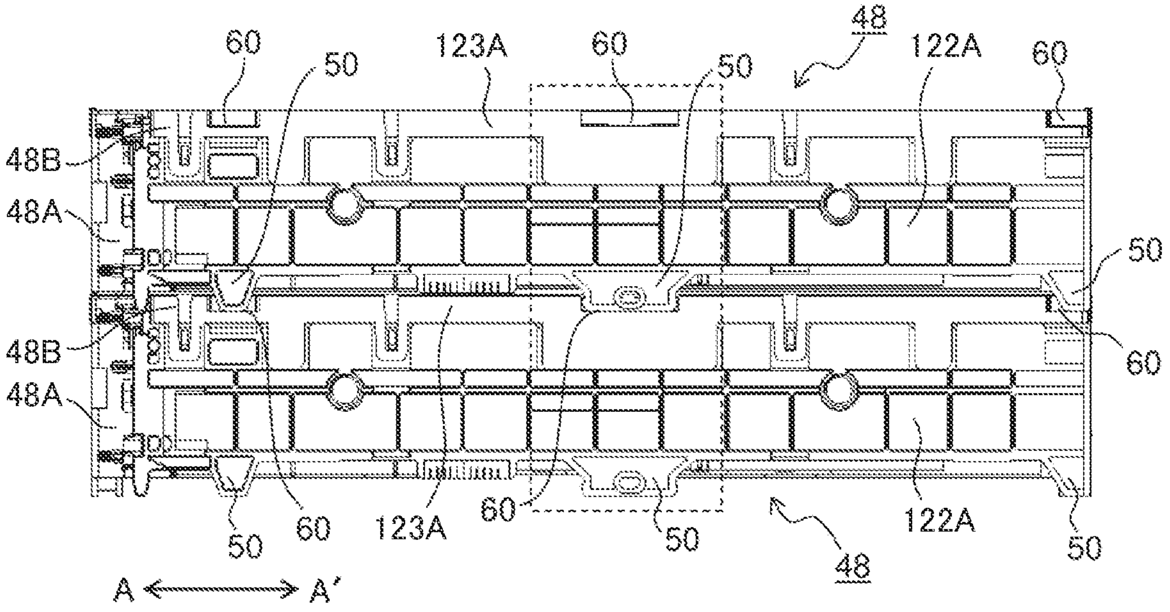
FIG. 16 is a side view showing the casings 48 stacked in two stages, seen from the front side of the optical scanning device 5.
Figure 17:
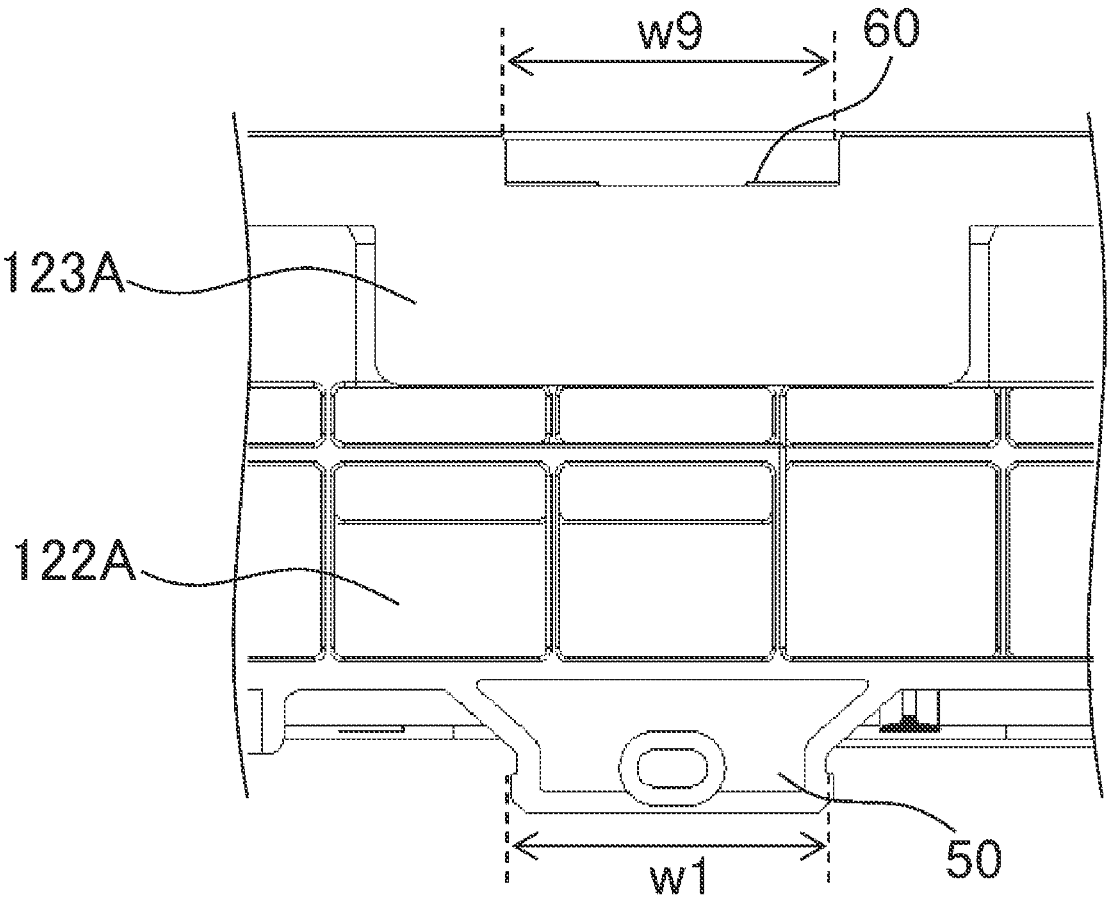
FIG. 17 is an enlarged side view showing a portion around the first engaging protrusion 50 in the main body 48A, and a first lid-side engaging recess 60 in a lid 48B.
Figure 18:
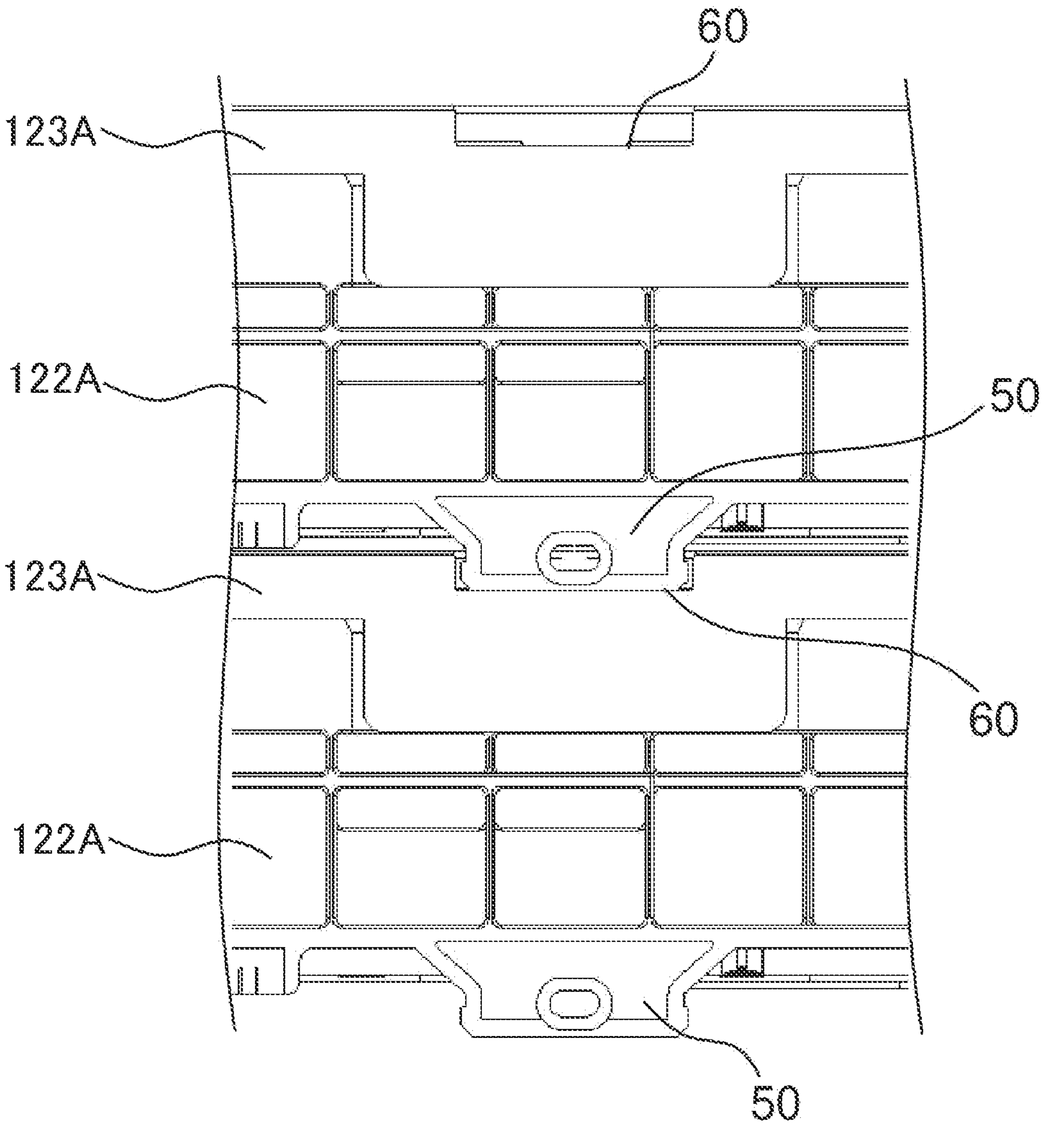
FIG. 18 is an enlarged side view from FIG. 16, showing a central portion in the left-right direction.

FIG. 16 is a side view showing the casings 48 stacked in two stages, seen from the front side of the optical scanning device 5. FIG. 17 is an enlarged side view showing a portion around the first engaging protrusion 50 in the main body 48A, and a first lid-side engaging recess 60 in the lid 48B. FIG. 18 is an enlarged side view from FIG. 16, showing a central portion in the left-right direction (enclosed by broken lines in FIG. 16). As shown in FIG. 16 to FIG. 18, the lid 48B includes the first lid-side engaging recesses 60, formed on a side face 123A oriented to the front side of the optical scanning device 5.

The first lid-side engaging recesses 60 are formed on the upper end portion of the side face 123A. The first lid-side engaging recesses 60 are formed at the positions respectively overlapping with the first engaging protrusion 50 and the first engaging recess 54 (see FIG. 4), in the left-right direction (indicated by the arrow A-A'). The width w1 of the first engaging protrusion 50 is slightly narrower than a width w9 of the first lid-side engaging recess 60.

Figure 19:
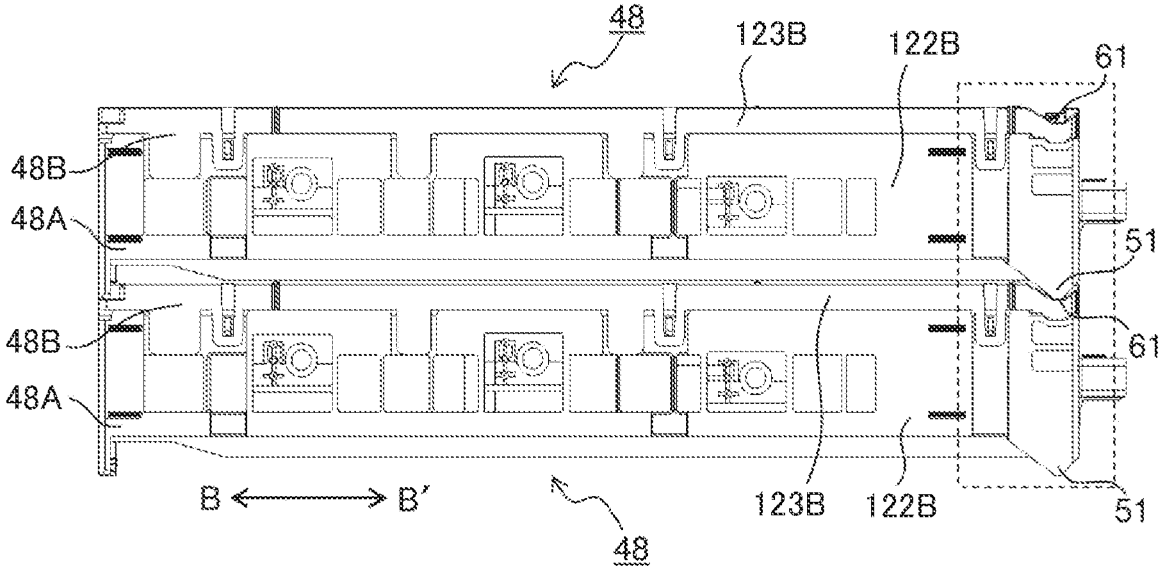
FIG. 19 is a side view showing the casings 48 stacked in two stages, seen from the right side of the optical scanning device 5.
Figure 20:
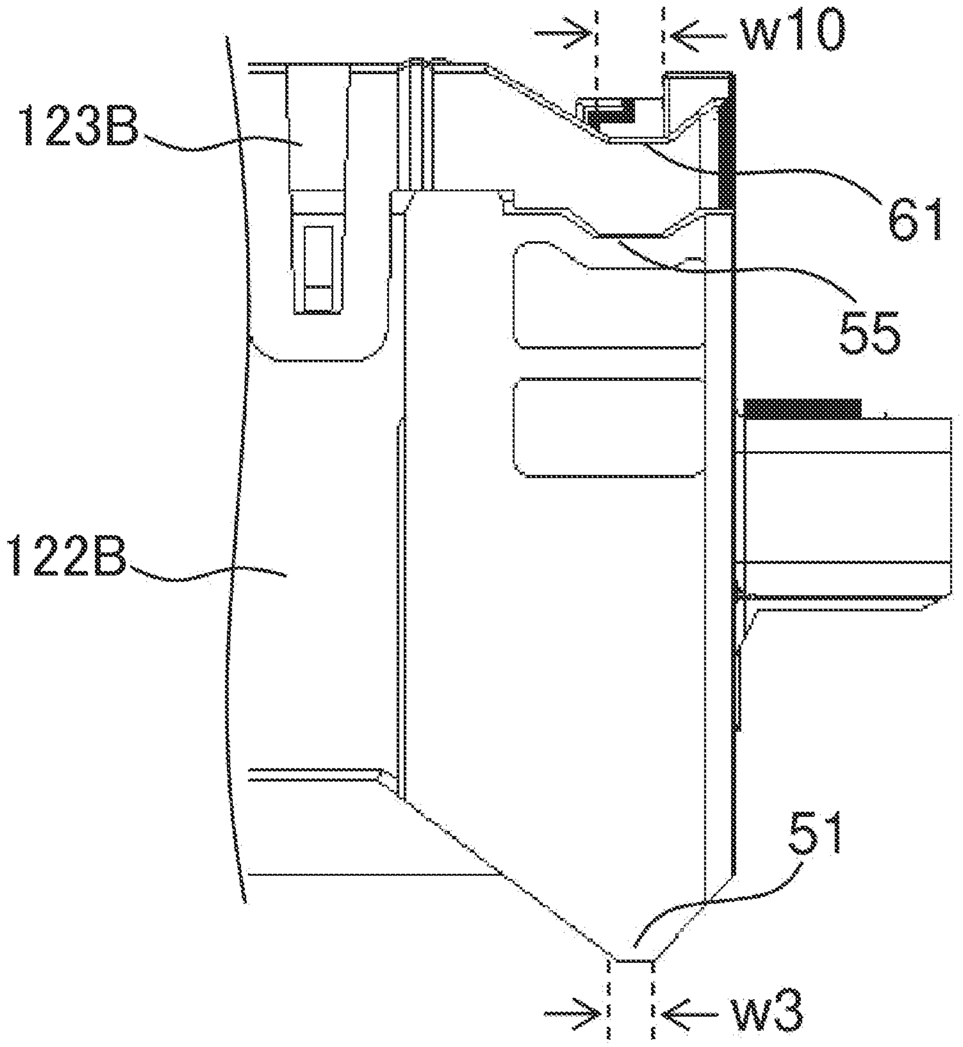
FIG. 20 is an enlarged side view showing a portion around the second engaging protrusion 51 in the main body 48A, and a second lid-side engaging recess 61 in the lid 48B.
Figure 21:
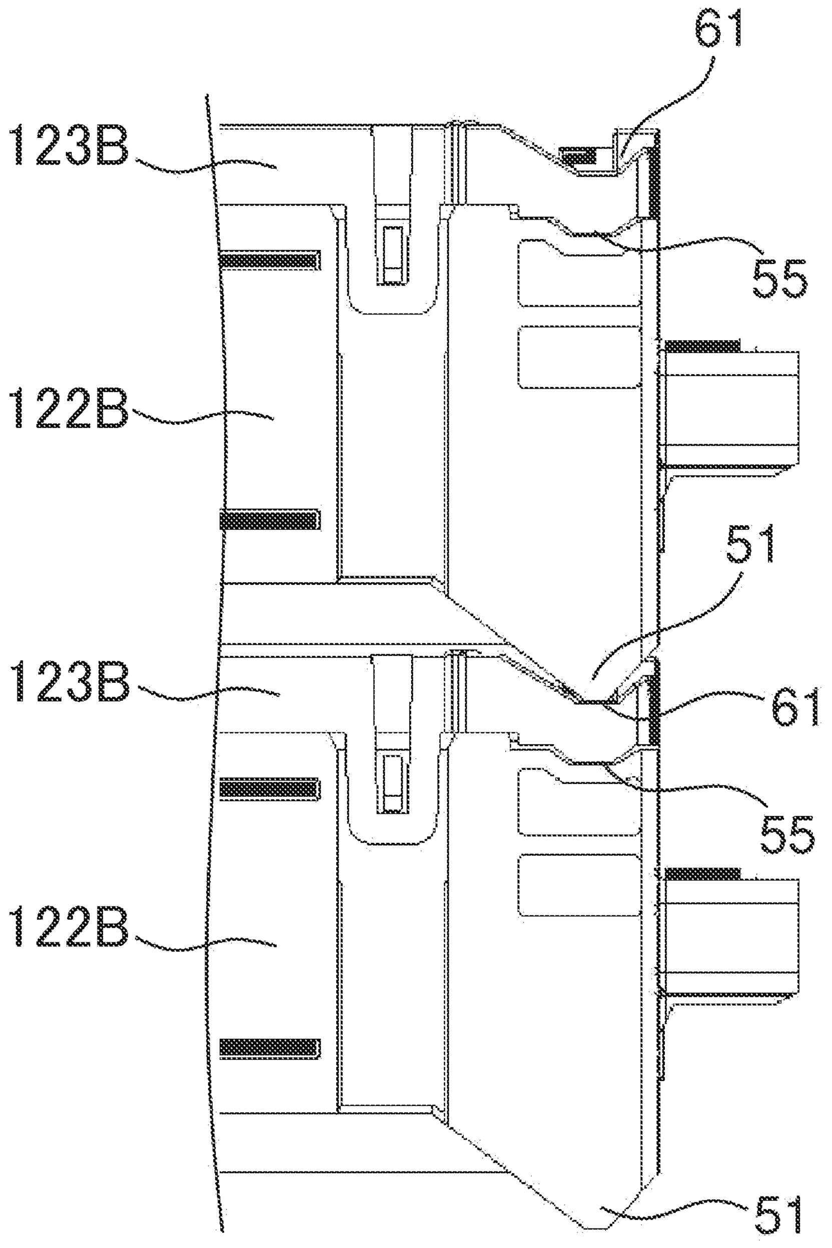
FIG. 21 is an enlarged side view from FIG. 19, showing a rear end portion in the front-rear direction.

FIG. 19 is a side view showing the casings 48 stacked in two stages, seen from the right side of the optical scanning device 5. FIG. 20 is an enlarged side view showing a portion around the second engaging protrusion 51 in the main body 48A, and a second lid-side engaging recess 61 in the lid 48B. FIG. 21 is an enlarged side view from FIG. 19, showing a right end portion (enclosed by broken lines in FIG. 19). As shown in FIG. 19 to FIG. 21, the lid 48B includes the second lid-side engaging recess 61, formed on a side face 123B oriented to the right side of the optical scanning device 5.

The second lid-side engaging recess 61 is formed on the upper end portion of the side face 123B. The second lid-side engaging recess 61 is formed at the position overlapping with the second engaging protrusion 51 and the second engaging recess 55, in the front-rear direction (indicated by the arrow B-B'). The width w3 of the second engaging protrusion 51 is slightly narrower than a width w10 of the second lid-side engaging recess 61.

Figure 22:
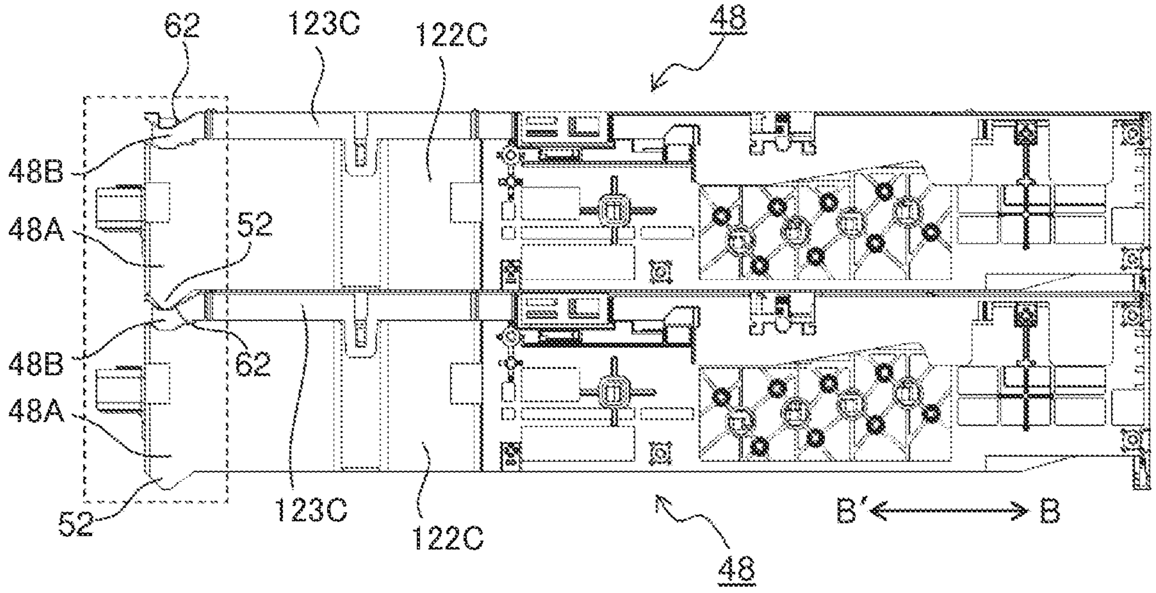
FIG. 22 is a side view showing the casings 48 stacked in two stages, seen from the left side of the optical scanning device 5.
Figure 23:
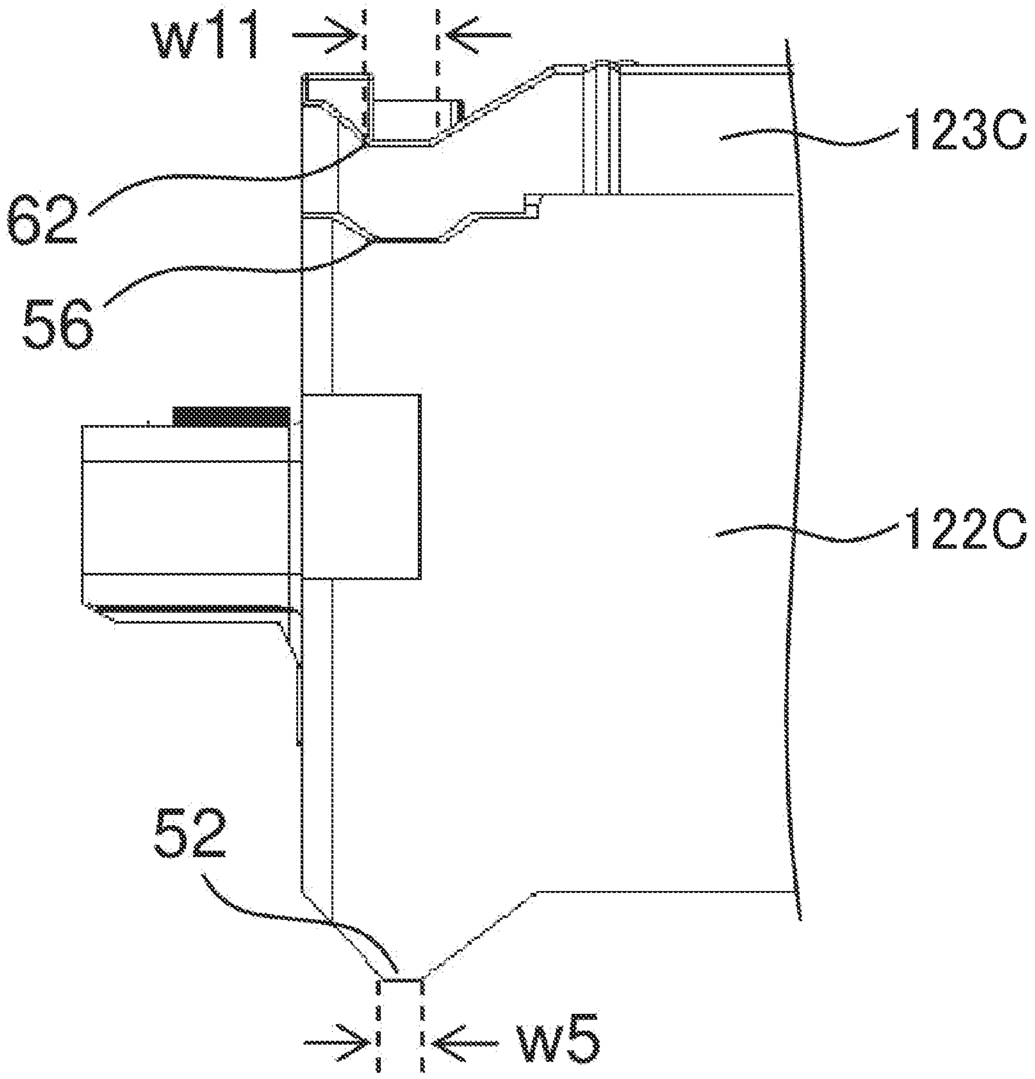
FIG. 23 is an enlarged side view showing a portion around the third engaging protrusion 52 in the main body 48A, and a third lid-side engaging recess 62 in the lid 48B.
Figure 24:
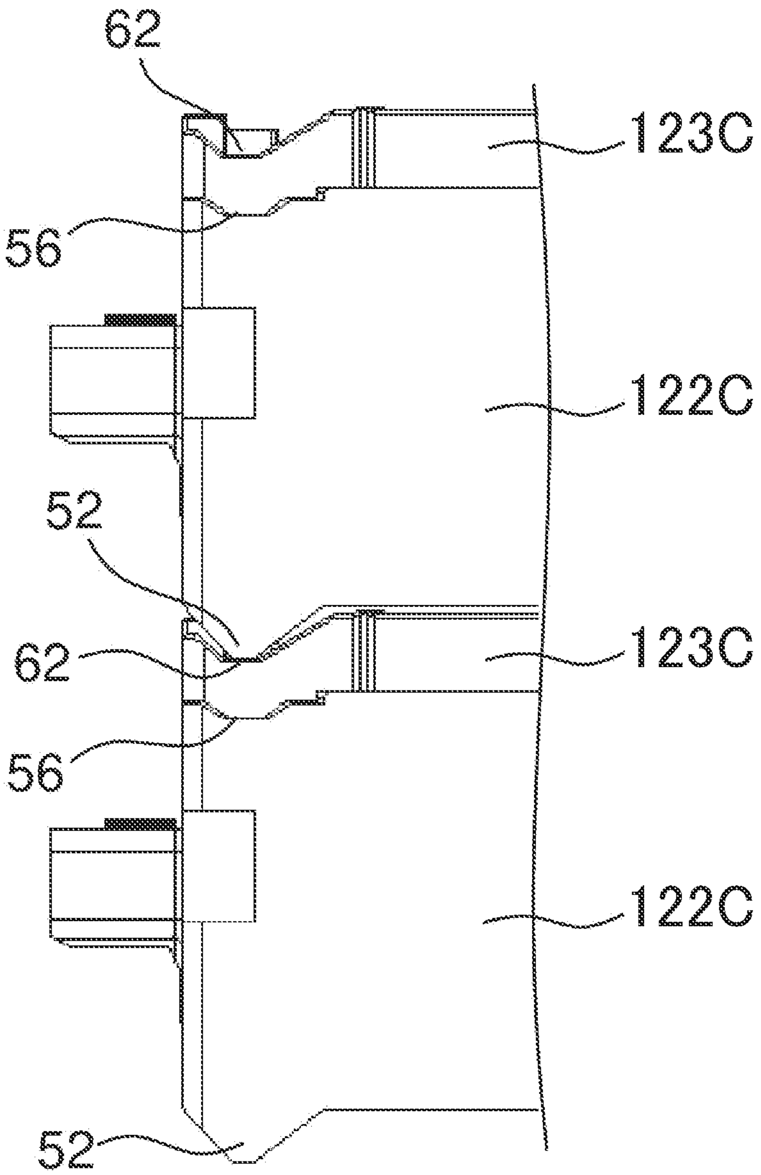
FIG. 24 is an enlarged side view from FIG. 22, showing a left end portion in the left-right direction.

FIG. 22 is a side view showing the casings 48 stacked in two stages, seen from the left side of the optical scanning device 5. FIG. 23 is an enlarged side view showing a portion around the third engaging protrusion 52 in the main body 48A, and a third lid-side engaging recess 62 in the lid 48B. FIG. 24 is an enlarged side view from FIG. 22, showing a left end portion (enclosed by broken lines in FIG. 22). As shown in FIG. 22 to FIG. 24, the lid 48B includes the third lid-side engaging recess 62, formed on a side face 123C oriented to the left side of the optical scanning device 5.

The third lid-side engaging recess 62 is formed on the upper end portion of the side face 123C. The third lid-side engaging recess 62 is formed at the position overlapping with the third engaging protrusion 52 and the third engaging recess 56, in the front-rear direction (indicated by the arrow B-B'). The width w5 of the third engaging protrusion 52 is slightly narrower than a width w11 of the third lid-side engaging recess 62.

Figure 25:
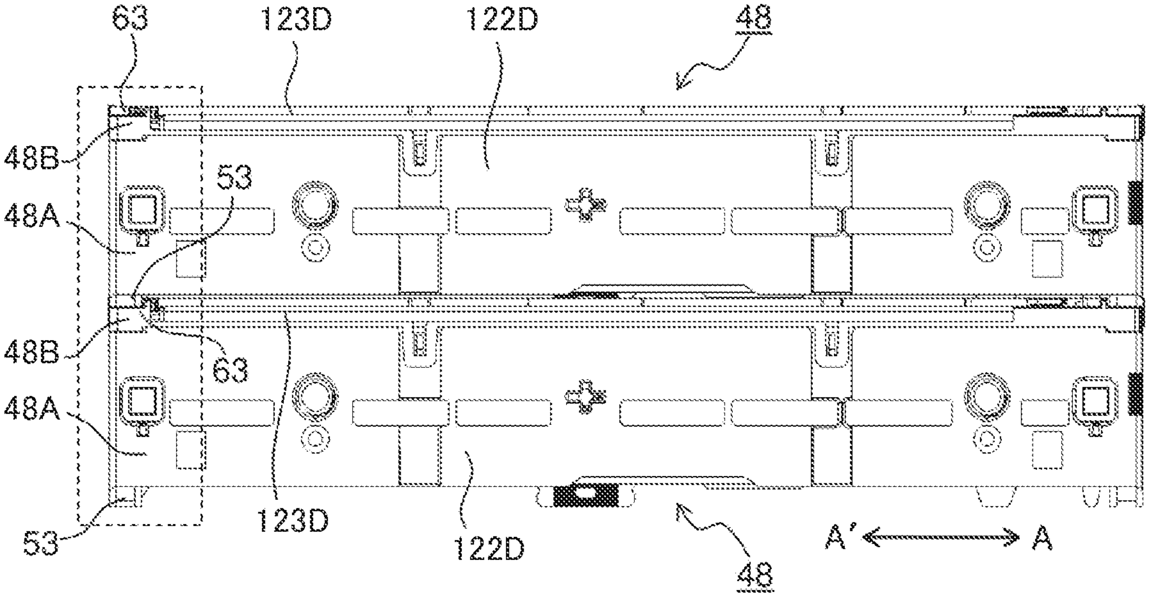
FIG. 25 is a side view showing the casings 48 stacked in two stages, seen from the rear side of the optical scanning device 5.
Figure 26:
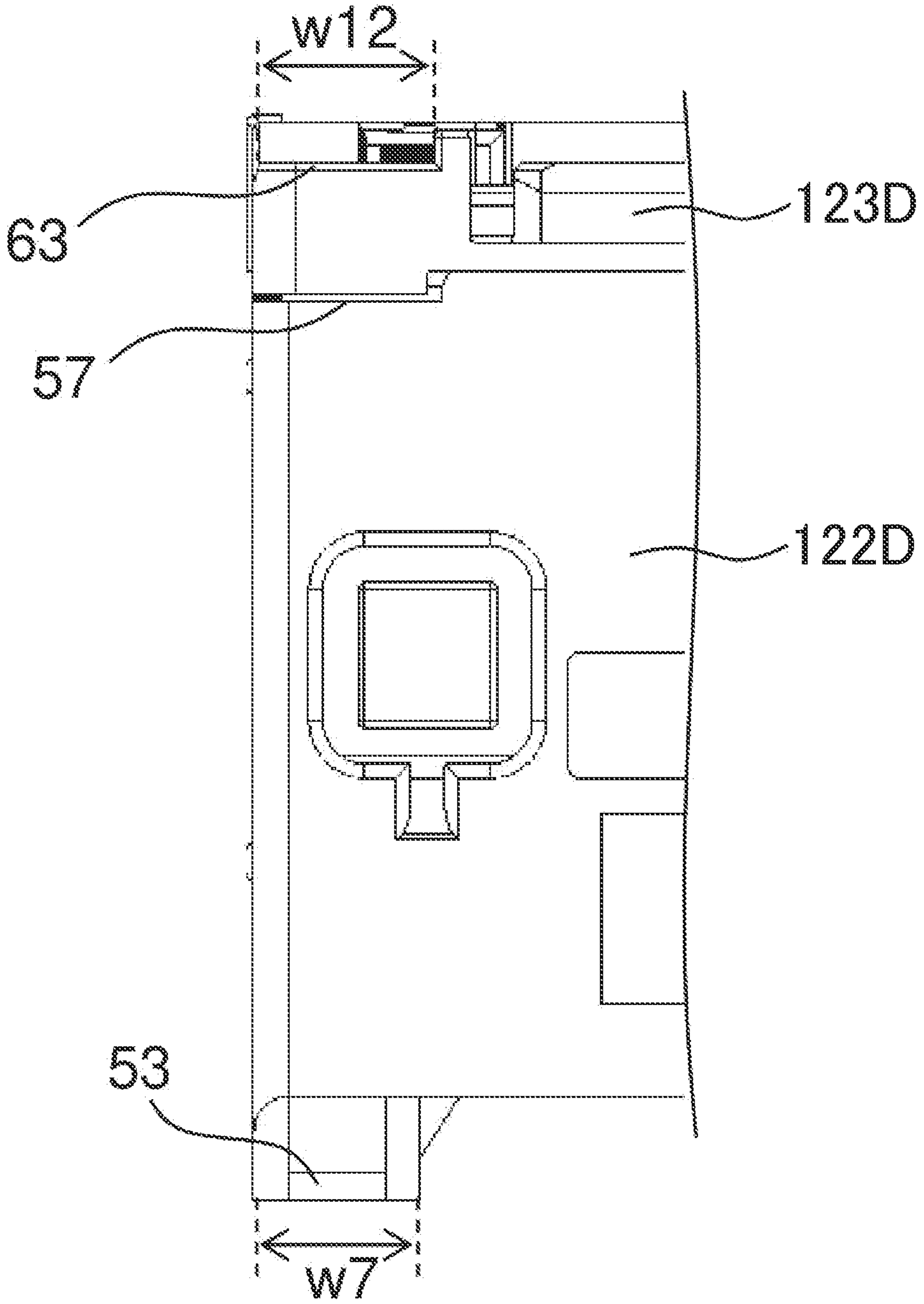
FIG. 26 is an enlarged side view showing a portion around the fourth engaging protrusion 53 in the main body 48A, and a fourth lid-side engaging recess 63 in the lid 48B.
Figure 27:
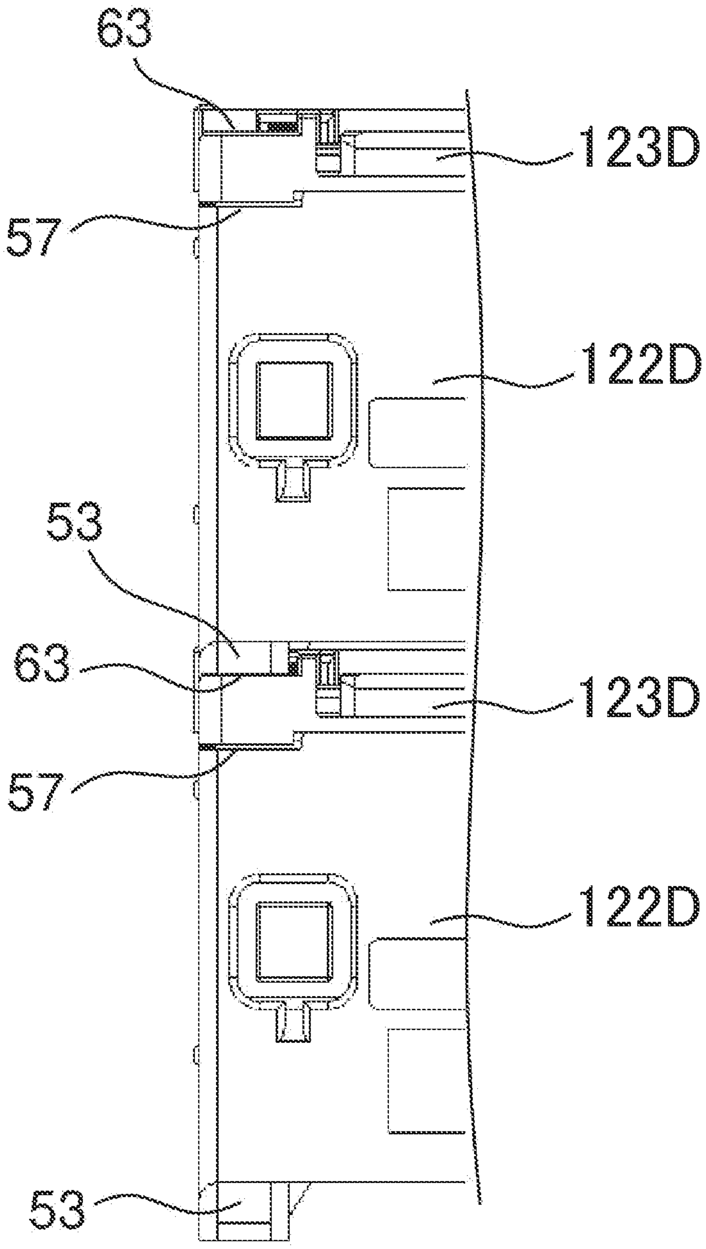
FIG. 27 is an enlarged side view from FIG. 25, showing a rear end portion in the front-rear direction.

FIG. 25 is a side view showing the casings 48 stacked in two stages, seen from the rear side of the optical scanning device 5. FIG. 26 is an enlarged side view showing a portion around the fourth engaging protrusion 53 in the main body 48A, and a fourth lid-side engaging recess 63 in the lid 48B. FIG. 27 is an enlarged side view from FIG. 25, showing a left end portion (enclosed by broken lines in FIG. 25). As shown in FIG. 25 to FIG. 27, the lid 48B includes the fourth lid-side engaging recess 63, formed on a side face 123D oriented to the rear side of the optical scanning device 5.

The fourth lid-side engaging recess 63 is formed on the upper end portion of the side face 123D. The fourth lid-side engaging recess 63 is formed at the position overlapping with the fourth engaging protrusion 53 and the fourth engaging recess 57, in the left-right direction (indicated by the arrow A'-A). The width w7 of the fourth engaging protrusion 53 is slightly narrower than a width w12 of the fourth lid-side engaging recess 63.

When the casings 48, with the main body 48A and the lid 48B combined together, are stacked in two stages, the first engaging protrusion 50 formed on the main body 48A of the casing 48 on the upper stage is engaged with the first lid-side engaging recess 60 formed on the lid 48B of the casing 48 on the lower stage (see FIG. 16 and FIG. 18). Likewise, the second engaging protrusion 51 formed on the main body 48A of the casing 48 on the upper stage is engaged with the second lid-side engaging recess 61 formed on the lid 48B of the casing 48 on the lower stage (see FIG. 19 and FIG. 21).

In addition, the third engaging protrusion 52 formed on the main body 48A of the casing 48 on the upper stage is engaged with the third lid-side engaging recess 62 formed on the lid 48B of the casing 48 on the lower stage (see FIG. 22 and FIG. 24), and the fourth engaging protrusion 53 formed on the main body 48A of the casing 48 on the upper stage is engaged with the fourth lid-side engaging recess 63 formed on the lid 48B of the casing 48 on the lower stage (see FIG. 25 and FIG. 27).

Accordingly, the casing 48 on the upper stage is positioned with respect to the casing 48 on the lower stage, in the horizontal direction namely the left-right direction and the front-rear direction, and in the up-down direction. The first to fourth engaging protrusions 50 to 53, and the first to fourth lid-side engaging recesses 60 to 63, constitute a second positioning mechanism for positioning the casing 48 on the upper stage with respect to the casing 48 on the lower stage, in the horizontal direction and the height direction, when the casings 48 are stacked in a plurality of stages.

Further, since the protrusion amount of the first to fourth engaging protrusions 50 to 53 from the lower end portion of the main body 48A is equal to the depth of the first to fourth lid-side engaging recesses 60 to 63 from the upper end portion of the lid 48B, the casing 48 on the upper stage can be stacked on the casing 48 on the lower stage, in the horizontal posture.

Here, while the first engaging protrusions 50, the first engaging recesses 54, and the first lid-side engaging recesses 60 are formed at three positions on the side face 122A of the main body 48A and the side face 123A of the lid 48B, the casing 48 on the upper stage can be properly positioned on the casing 48 on the lower stage, even though the protrusions and recesses are formed, for example, only at the central position of the side faces 122A and 123A. However, when the light source and the scanning optical system are installed inside the casing 48, the weight of the casing 48 is increased, and the casing 48 may suffer deflection deformation. In this embodiment, therefore, the first positioning mechanism and the second positioning mechanism are formed at the four corners of the casing 48, so that the deflection deformation of the casing 48 can be prevented.

Now, in the case of the aforementioned existing casing, it is only the casings that can be stacked, and the casings are unable to be stacked when the lid is attached thereto. Therefore, it is difficult to transport the optical scanning device in the assembled state, or to make the storage space for such devices more compact. In addition, the casing includes connection legs protruding downward from the lower face, and therefore the connection leg may be damaged, when the casing is placed on a flat surface. Further, although a method to break the connection legs and remove the same is known, such a method requires additional works for breaking the connection legs, and disposing of the removed parts and the broken waste.

According to this embodiment, in contrast, the main bodies 48A of casing 48 alone can be stacked in a plurality of stages, and the casings 48 (optical scanning device 5), assembled by attaching the lid 48B to the main body 48A, can also be stacked in a plurality of stages. Therefore, the reduction in transport cost and storage space of the main body 48A alone, and the reduction in transport cost and storage space of the optical scanning device 5 in the assembled state, can both be realized.

Further, when the main bodies 48A alone are stacked in a plurality of stages, the first to fourth engaging protrusions 50 to 53 and the first to fourth engaging recesses 54 to 57 of the main body 48A are respectively engaged with each other. In the case of stacking the casings 48 (optical scanning device 5), with the main body 48A and the lid 48B combined together, in a plurality of stages, the first to fourth engaging protrusions 50 to 53 of the main body 48A, and the first to fourth lid-side engaging recess 60 to 63 of the lid 48B are respectively engaged with each other. In other words, the first to fourth engaging protrusions 50 to 53 serve as the common positioning mechanism, for both of the cases of stacking the main bodies 48A alone in a plurality of stages, and stacking the assembled casings 48 in a plurality of stages. Therefore, the structure of the casing 48 can be simplified.

The disclosure is not limited to the foregoing embodiment, but may be modified in various manners without departing from the spirit of the disclosure. According to the embodiment, for example, the first to fourth engaging protrusions 50 to 53 (first engaging portion) are configured to be engaged with both of the first to fourth engaging recesses 54 to 57 (first engaging counterpart) and the first to fourth lid-side engaging recesses 60 to 63 (second engaging counterpart). Instead, engaging protrusions (second engaging portion) to be respectively engaged with the first to fourth lid-side engaging recesses 60 to 63 (second engaging counterpart) may be provided, independently from the first to fourth engaging protrusions 50 to 53.

According to the foregoing embodiment, the first to fourth engaging protrusions 50 to 53 (first engaging portion) are formed on the lower end portion of the main body 48A, and the first to fourth engaging recesses 54 to 57 (first engaging counterpart) are formed on the upper end portion of the main body 48A. Instead, the location of the engaging protrusions and the engaging recesses may be reversed. To be more specific, the first to fourth engaging recesses (first engaging portion) may be formed on the lower end portion of the main body 48A, and the first to fourth engaging protrusions (first engaging counterpart) may be formed on the upper end portion of the main body 48A. In this case, first to fourth lid-side engaging protrusions (second engaging counterpart) are formed on the lid 48A, in place of the first to fourth lid-side engaging recesses 60 to 63.

In addition, the location of the scanning optical system inside the casing 48 is not limited to the arrangement shown in FIG. 3. For example, the polygon mirror 45 may be located at a generally central position of the casing 48, and the first scanning lens 46A and the second scanning lenses 47A and 47B may be located so as to oppose to another first scanning lens 46A and the second scanning lenses 47C and 47D, across the polygon mirror 45.

Further, although the image forming apparatus 100 in which the optical scanning device 5 is incorporated is exemplified by the tandem-type color printer, the disclosure is also applicable, without limitation to the color printer, to an electrophotographic image forming apparatus such as a color copier or a facsimile machine, and an electrophotographic monochrome image forming apparatus such as a monochrome printer or a monochrome multifunction peripheral.

Industrial Applicability

The disclosure is appliable to the casing of the optical scanning device that emits light to the image carrier to thereby form an electrostatic latent image. The disclosure enables both of the main bodies alone and the main bodies with the lid attached, to be stacked in a plurality of stages, thereby providing the casing for the optical scanning device that can reduce the transport cost and storage space, and the optical scanning device having such casing.

While the present disclosure has been described in detail with reference to the embodiments thereof, it would be apparent to those skilled in the art the various changes and modifications may be made therein within the scope defined by the appended claims.

What is claimed is:

1. A casing for an optical scanning device, configured to accommodate therein a scanning optical system, the casing comprising:

a main body including an opening formed in an upper face;

a lid that closes the opening of the main body;

a first positioning mechanism that positions, when a plurality of the main bodies are stacked in a plurality of stages without the lid attached, a main body on an upper stage in a horizontal direction and a height direction, with respect to a main body on a lower stage; and a second positioning mechanism that positions, when a plurality of casings each having the lid attached to the main body are stacked in a plurality of stages, a casing on an upper stage in the horizontal direction and the height direction, with respect to a casing on a lower stage, wherein the first positioning mechanism includes:

a plurality of first engaging portions formed on a lower end portion of the main body; and a plurality of first engaging counterparts formed on an upper end portion of the main body, to be opposed to the respective first engaging portions, the second positioning mechanism includes:

a plurality of second engaging portions formed on the lower end portion of the main body; and a plurality of second engaging counterparts formed on an upper end portion of the lid, to be opposed to the respective second engaging portions, when the main bodies are stacked in a plurality of stages without the lid attached, the main body on the upper stage is positioned with respect to the main body on the lower stage in the horizontal direction and the height direction, through engagement between a first engaging portion and a first engaging counterpart, and when the casings each having the lid attached to the main body are stacked in a plurality of stages, the casing on the upper stage is positioned with respect to the casing on the lower stage in the horizontal direction and the height direction, through engagement between a second engaging portion and a second engaging counterpart.

2. The casing according to claim 1, wherein the first engaging portion also serves as the second engaging portion.

3. The casing according to claim 1, wherein the first positioning mechanism and the second positioning mechanism are each formed on three or more positions that do not fall on a same straight line.

4. The casing according to claim 1, wherein the first engaging portion and the first engaging counterpart have an inverted trapezoidal shape in a side view.

5. An optical scanning device comprising:

a scanning optical system that scans, with a light beam, a surface of an image carrier charged to a predetermined surface potential, thereby exposing the surface of the image carrier to the light beam, and forms an electrostatic latent image by attenuating the charge; and the casing according to claim 1 configured to retain optical elements constituting the scanning optical system.

6. A casing for an optical scanning device, configured to accommodate therein a scanning optical system, the casing comprising:

a main body including an opening formed in an upper face;

a lid that closes the opening of the main body;

a first positioning mechanism that positions, when a plurality of the main bodies are stacked in a plurality of stages, the main body on an upper stage in a horizontal direction and a height direction, with respect to the main body on a lower stage; and a second positioning mechanism that positions, when a plurality of the casings, each having the lid attached thereto, are stacked in a plurality of stages, the casing on the upper stage in the horizontal direction and the height direction, with respect to the casing on the lower stage, wherein the first positioning mechanism and the second positioning mechanism are each formed on three or more positions that do not fall on a same straight line, wherein the main body and the lid have a rectangular shape in a plan view, and the first positioning mechanism and the second positioning mechanism are formed on four corners of the main body and the casing.

* * * * *